United States Patent [19]

Lelm et al.

[11] Patent Number: 5,448,715

[45] Date of Patent: Sep. 5, 1995

[54] DUAL CLOCK DOMAIN INTERFACE BETWEEN CPU AND MEMORY BUS

[75] Inventors: Charles A. Lelm; William S. Jaffe, both of Fort Collins, Colo.

[73] Assignee: Hewlett-Packard Company, Palo Alto, Calif.

[21] Appl. No.: 922,127

[22] Filed: Jul. 29, 1992

[51] Int. Cl.[6] .............................................. G06F 1/08
[52] U.S. Cl. .................................................. 395/550
[58] Field of Search ....................................... 395/550; 364/DIG. 2 MS File

[56] References Cited

U.S. PATENT DOCUMENTS 4,527,145  7/1995  Haussmann et al. ............... 358/19
5,099,477  3/1992  Taniguchi et al. ................... 370/97

*Primary Examiner*—Thomas M. Heckler

[57] ABSTRACT

A system and method for isolating the timing domain of a central processing unit (CPU) from the timing domain of a memory bus is described. The CPU interfaces with memory and input/output through a dual clock domain interface (DCDI). The DCDI allows the CPU and memory to operate at frequency ratios of N:M, where N and M are positive integers, with N greater than or equal to M. The CPU operating clock speed is not constrained by the operating speed of the memory and input/output. The primary components of the DCDI are: 1) domain translation buffers, 2) clock control circuit, 3) output data queue and 4) receiver modifier circuits. A domain translation buffer takes data from one clock domain and translates it into another clock domain. The clock control circuit generates appropriate clocks according to the current frequency ratio of the system. An output data queue is required when the CPU generates data faster than the memory can accept. A receiver modifier circuit fills in empty states with appropriate signal values for each of the memory bus protocol lines during memory to CPU transfers.

21 Claims, 20 Drawing Sheets

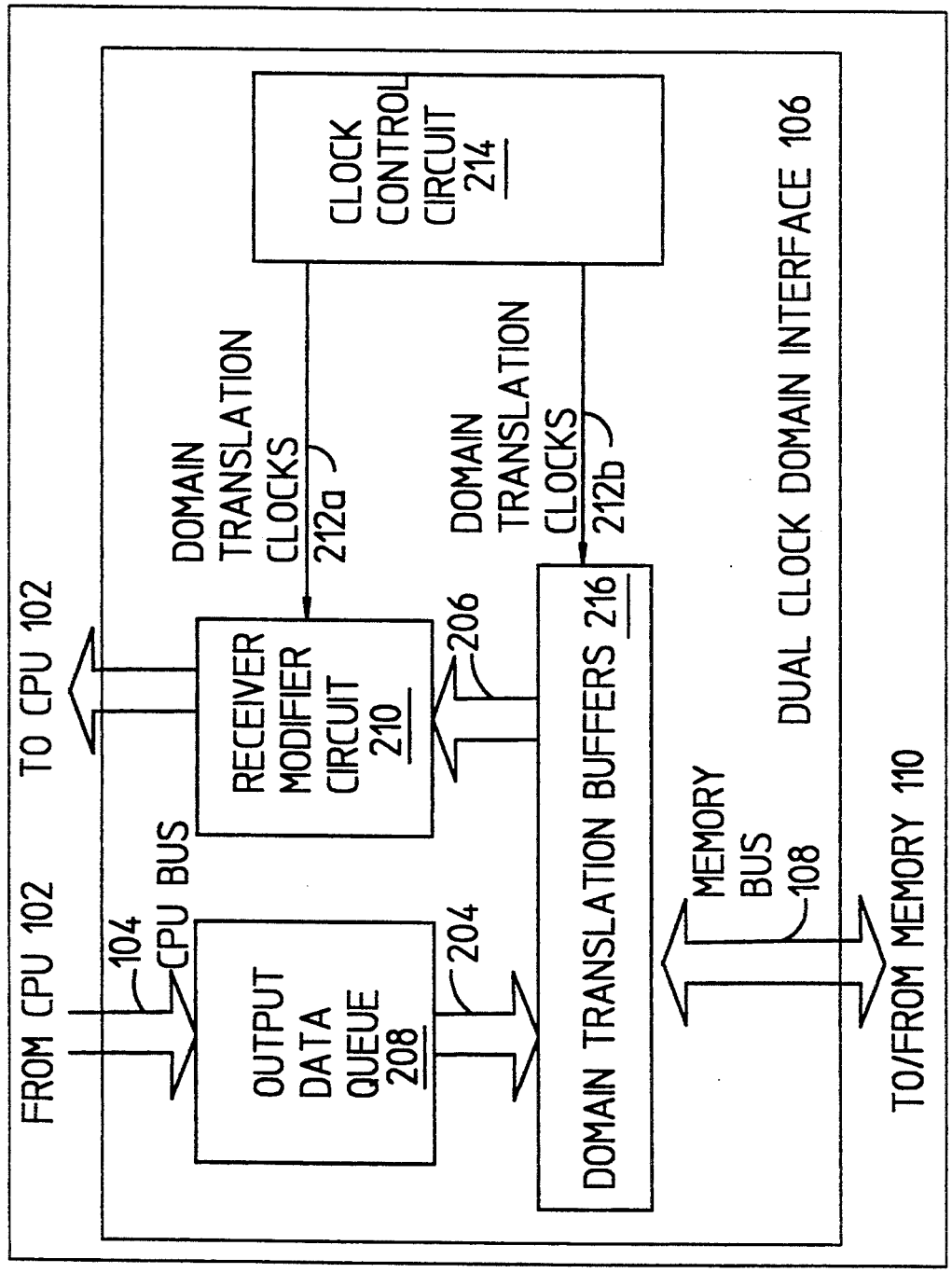

DUAL CLOCK DOMAIN INTERFACE BETWEEN CPU AND MEMORY BUS

BACKGROUND OF THE INVENTION

1. Field of the Invention

The present invention relates generally to a system and method for interfacing the timing control between components in a computer based system. More particularly, the present invention relates to a system and method for isolating the timing domain of a CPU from the timing domain of a memory bus.

2. Related Art

In conventional computer systems, processor speed is constrained by memory bus speed. Memory bus speeds are generally slower than top processor speeds today. When a processor shares a bus with its associated memory, the maximum operating speed is limited to the speed of the slowest component, the memory.

With the fast pace of today's computer system design cycles, technology improvements, and continuously increasing performance goals, it has become desirable to upgrade or modify existing computer systems in a timely and cost effective manner. In the design of high performance computer systems, a central processing unit (CPU) is usually the target for providing the greatest improvements in performance levels, and the operating speed of the CPU is usually constrained to that of peripheral devices which may be connected to it. It is now possible and desirable to design a CPU integrated circuit which operates at much faster speeds than existing peripheral devices. Furthermore, it is desirable to design the CPU such that it can operate at a number of different speed ratios so that it may be used in several different computer system configurations.

Current computer systems which implement components operating at differing clock frequencies are restricted to operating such components only at frequency ratios of N:1, where N is a fixed positive integer. Such prior systems also relied on complex general synchronizers to coordinate data transfers between components.

What is needed is a system and method for allowing the CPU and memory to operate transparently and interchangeably at frequency ratios of N:M, (where N and M are integers, with N greater than or equal to M) to take advantage of non-integer multiples of processor to memory bus speed. In general, what is needed is a system where CPU clock speed need not be constrained by the operating speed of a peripheral device.

SUMMARY OF THE INVENTION

The present invention is directed to a system and method for transparently isolating the timing domain of a CPU from the timing domain of a memory bus. The invention described herein provides a system and method for isolating the CPU timing from that of the memory bus, enabling the CPU to run at a faster rate than the memory bus. The present invention (hereinafter referred to as the Dual Clock Domain Interface, or DCDI) allows for frequency ratios of the form N:M, (where N and M are integers and N is greater than or equal to M) and does not require complicated synchronizers. It also enables the CPU to operate as if it were "unaware" of the differing memory bus speed.

A processor chip interfaces through an on chip DCDI to its associated memory and input/output devices via a memory bus. A system clock generator provides clocks to the computer system components. The clocks are generated from a single crystal oscillator which has a frequency that is the least common multiple of the CPU clock frequency and the memory bus frequency. In a data store operation, DCDI accepts data at a first clock rate coming from the CPU. The data is buffered, retimed and output at a second (usually slower) clock rate to the memory unit. In a data read operation, memory sends selected data on a memory bus to the DCDI. The DCDI buffers, retimes and outputs data to the CPU.

The primary components of the DCDI are: 1) a domain translation buffer, 2) a clock control circuit, 3) an output data queue and 4) a receiver modifier circuit. The domain translation buffer receives data from one clock domain and translates it into another clock domain. This is accomplished by using special clock signals which depend on the direction a signal is propagating. The clock control circuit generates appropriate clocks according to the current frequency ratio of the system. The clock control circuit is designed to accommodate the CPU to memory bus frequency ratios N:M. An output data queue is required when the CPU generates data faster than the memory can accept. The output data queue stores data in a first-in/first-out fashion and is designed to be large enough to handle the longest expected transfer at the highest frequency ratio. Conversely, since the CPU may expect memory bus data to arrive at the CPU clock frequency, there will be CPU domain clock states during which there are no valid memory bus signals to read. A receiver modifier circuit fills in such empty states with appropriate signal values for each of the memory bus protocol lines.

One feature of the present invention is that it allows a CPU and memory to transparently operate at different clock frequencies. In other words, the present invention allows the CPU to operate at a higher frequency than memory, unconstrained by the slower memory speed.

Another feature of the present invention is that it allows a processor chip upgrade to be accomplished without having to replace a motherboard or any other system components. A processor with a faster operating speed may replace the current processor without the need to replace any other system parts. The processor is connected to memory via a variable frequency synchronous memory bus. This bus is the same bus used in existing processor designs, defined later. This processor can be used with existing memory controllers as well as future memory controller designs. This provides for a wide variety of system configurations at various price/performance trade-offs.

Further features and advantages of the present invention, as well as the structure and operation of various embodiments of the present invention, are described in detail below with reference to the accompanying drawings.

BRIEF DESCRIPTION OF THE DRAWINGS

FIG. 2 illustrates a block diagram of a Dual Clock Domain Interface (DCDI).

FIG. 8b illustrates a schematic diagram of latches Y0-Y2, RP1, RC1, DP1 and DC1 of FIG. 8a.

FIG. 8c illustrates a schematic diagram of latches RP2 and DP2 of FIG. 8a.

FIG. 9b illustrates a schematic diagram of master slave latches R1-R5 of FIG. 9a.

Figure 1:
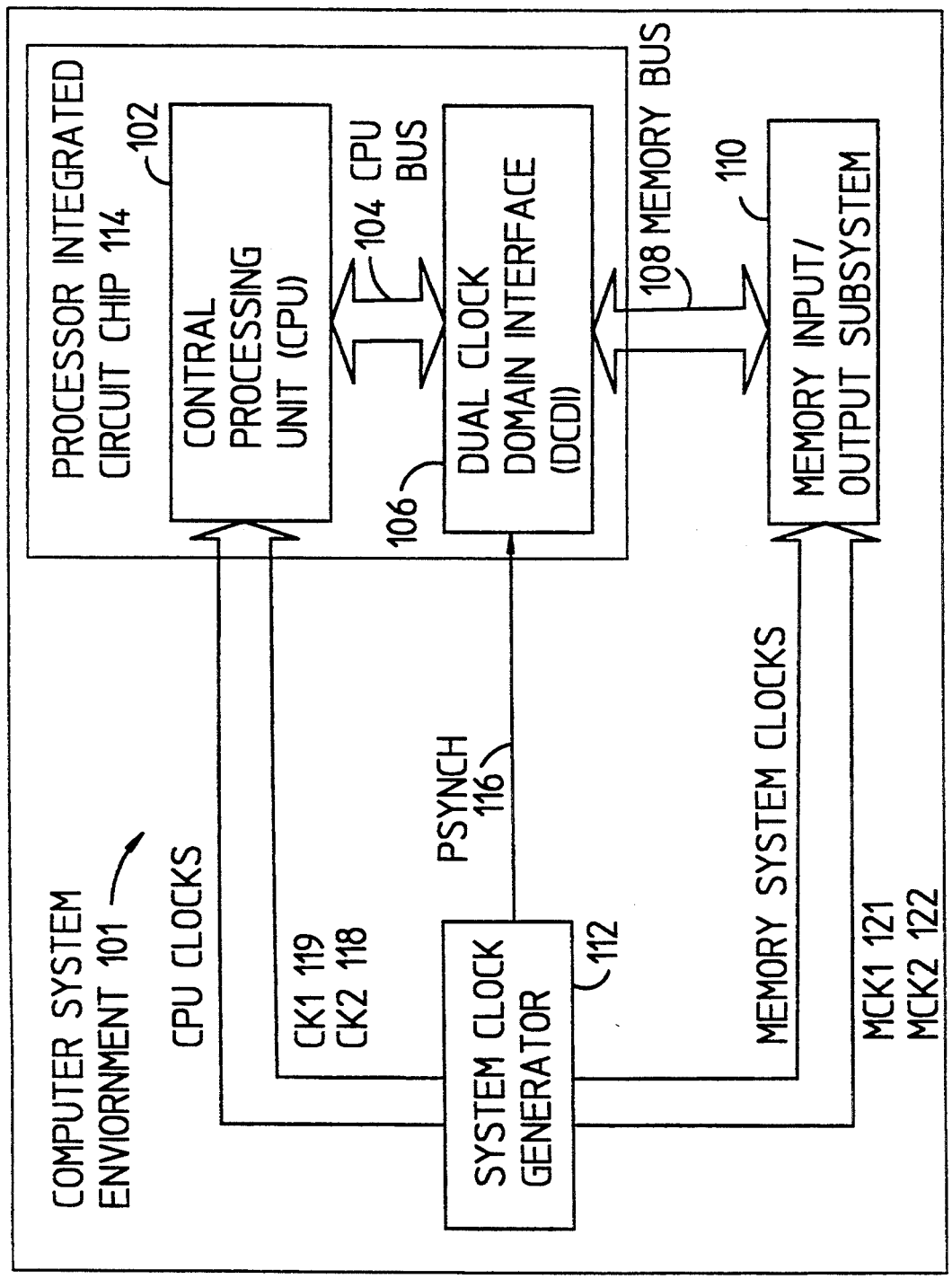
FIG. 1 illustrates a system block diagram of the computer environment in which the present invention operates.

In the drawings, the left-most digit of a reference number identifies the drawing in which the reference number first appears.

DETAILED DESCRIPTION OF THE INVENTION 1.0 Overview

The present invention is directed to a computer-based system and method for isolating the timing domain of a CPU from the timing domain of a memory bus. The present invention allows a CPU to operate at a different clock rate from a computer memory bus without being constrained by the slower memory bus clock rate.

A processor chip interfaces through a Dual Clock Domain Interface (DCDI) to its associated memory and input/output devices via a memory bus. In a data store operation, the DCDI accepts data at a first clock rate coming from a CPU. The data is buffered, retimed and output at a second (usually slower) clock rate to the memory unit. In a data read operation, memory sends selected data on a memory bus to the invention. The invention buffers, retimes and outputs data to the CPU.

2.0 Overall Environment

An overall system and method in which the present invention may be used is generally described in an article by E. DeLano et al., titled "A High Speed Superscalar PA-RISC Processor," *IEEE Compcon Spring '92 Digest of Papers*, February 1992. The environment described in this article is only one of many computer systems in which the present invention could be used. The DeLano article is incorporated herein by reference as if set forth below in full. Further general background material is contained in *Computer Architecture: A Quantitative Approach*, Hennessy et al., specifically chapters 8, 9 and Appendix E, Morgan Kaufmann Publishers, Inc. 1990; the entire text of which is incorporated by reference as if set forth below in full.

A preferred embodiment of the present invention is included in an improvement over Precision Architecture-Reduced Instruction Set Computers (PA-RISC) processors currently in use in Hewlett Packard's high performance Series 700 workstations and Series 800 and 900 multiuser computer systems built by Hewlett-Packard Company, Palo Alto Calif., USA. The processor speeds in this environment are in the 100 Mhz range.

PA-RISC is composed of several of the elemental design features found in most RISC architectures in use today. RISC architectures are well known and will not be discussed in detail. Briefly, some of the highlights of a RISC based system of the preferred embodiment will now be listed. Instructions words are 32 bits in length. Memory can only be referenced with explicit load or store instructions. There are few addressing modes. Computational instructions read their operands and write their results to the general register file. Floating-point computations are executed on an attached coprocessor with its own register file. Optimizing compilers are used to allow applications to use the architecture efficiently. However, it should be noted that this invention relates to any high speed computer system environment regardless of architecture and across any frequency range and method of operation.

3.0 Computer System of the Present Invention

FIG. 1 illustrates a block diagram of a computer system environment 101 in which the system and method of the present invention operate. A processor chip 114 interfaces through its on-chip Dual Clock Domain Interface (DCDI) 106 to its associated memory and input/output device(s) 110 via a variable frequency synchronous memory bus 108. This bus is the same bus used in existing PA-RISC processor designs. The processor 114 can be used with existing memory controllers, as well as future memory controller designs. This provides for a wide variety of system configurations at various price/performance trade-offs.

DCDI 106 operates by isolating CPU 102 on the processor chip 114 from memory 110. In the preferred embodiment, DCDI 106 allows CPU 102 to operate transparently at a frequency ratio of N:2, where N is equal to one of the integers 2, 3 or 4. As will become apparent to those skilled in the art, any ratio of N:M, where N and M are integers is within the scope of this invention. Transparent operation allows a CPU to operate without having to slow down to the speed of the memory. Memory 110 appears to the CPU 102 to be able to accept memory writes from the CPU 102 at the same speed as the CPU 102 can write. DCDI 106 is not limited to this preferred on-chip embodiment. It may be included on its own separate chip or on other chips without departing from the scope of the invention.

Memory 110 includes a standard dynamic random access memory (DRAM) combined with its associated interface controller, but any type or size of memory such as ROM or SRAM and compatible controller may be substituted.

DCDI 106 is functionally located between CPU 102 and memory 110 and acts as a buffer between CPU 102 and memory 110. CPU 102 stores data to and fetches data from memory 110. Memory bus 108 provides the physical connections for a synchronous transaction based interface between a processor chip 114 and memory 110. Other devices also may connect to memory bus 108. These other devices may include peripherals and processor dependant hardware (not shown).

In a data store operation, DCDI 106 accepts data at a first clock rate coming from a CPU 102. The data is buffered, synchronized and output at a second, usually slower, clock rate to memory 110. In a data fetch (read) operation, the memory sends selected data on memory bus 108 to DCDI 106. DCDI 106 buffers, retirees and outputs the CPU destined data onto the higher speed CPU bus 104.

Both CPU 102 and the memory unit 110 (through its own memory interface chip, not shown) may initiate transactions on the memory bus 108. All other input-/output or peripheral devices (not shown) must wait to have their interrupts recognized by the CPU 102.

A system clock generator 112 provides clock signals to the computer system components. It generates the memory clock signals 121, 122, CPU clock signals 118, 119, and a clock signal PSYNCH 116. These clocks are generated from a single crystal oscillator (not shown) located in the system clock generator 112, which has a frequency that is the least common multiple of the CPU clock frequency and the memory bus frequency. CPU CK1 119 and CPU CK2 118 are a complementary pair and set the operating speed of the CPU 102. Memory system clocks in general may consist of many clock signals for memory (and I/O) 110, but herein it is only necessary to refer to memory CK1 121 and CK2 122 (or MCK1, MCK2). The specification of PSYNCH 116 (detailed later) simplifies the design of the DCDI 106, and is simple to generate.

Memory bus 108 signals fall into three different categories: 1) protocol, 2) interrupt and reset, and 3) data. Protocol signals are used to control access and use of the memory bus 108. The majority of communication between CPU 102 and memory 110 on memory bus 108 are protocol signals. These signals are driven on the rising edge of MCK1 121 and are held steady during the time MCK2 122 is high. These signals are then acted on while MCK2 122 is high. Interrupt signals (not shown) include both external and dedicated synchronous machine check lines. Reset signals (not shown) use their own dedicated lines and are used at power up and when a master reset command is executed. A data portion of the memory bus 108 carries parallel bits of memory words for load, store and cache transactions.

The operation and structure of the Dual Clock Domain Interface (DCDI) 106 will now be described in more detail.

4.0 Dual Clock Domain Interface

FIG. 2 illustrates a block diagram of the DCDI 106. The DCDI 106 includes the primary components of the invention: a domain translation buffer 216, a clock control circuit 214, an output data queue 208, and a receiver modifier circuit 210. A clock domain (or just domain) is defined with respect to each system component or bus that runs at a different speed. Signals internal to the CPU 102 (i.e., that change levels on a CPU clock edge) are said to "belong" to the CPU Domain. Similarly, signals on the memory bus 108 are said to be in the memory bus domain. A domain translation buffer 216 takes a signal from one clock domain and "translates" it into another clock domain. Domain translation buffer 216 will be described in more detail in section 5.0.

The signal translation is accomplished using special clock signals (defined for each domain) which depend on the direction a signal is propagating. Such domain translation clocks 212a, 212b are generated by the clock control circuit 214. Clock control circuit 214 will be described in section 6.0. When the CPU 102 is operating at a higher frequency than that of the memory system 110, the CPU 102 may generate data to be driven out into the memory bus 108 at a faster rate than the memory bus can accommodate, such as during a store to memory from a dirty data cache line. In such cases, an output data queue 208 is required.

The output data queue 208 stores CPU domain data to be supplied via bus 204 to the domain translation buffers 216. The output data queue 208 stores data in a first-in-first-out fashion, but it is not strictly a FIFO queue (i.e., one entry, one exit); it is more appropriately described as a variable-entry shift register (i.e., data can be loaded into any of the shift register components). The output data queue 208 will be described more fully in section 7.0.

Conversely, since the CPU 102 may expect memory bus data to arrive at the CPU clock frequency, there will be CPU domain clock states where there are no valid memory bus signals to read. A receiver modifier circuit 210 fills in such "empty" states with appropriate signal values for each of the memory bus protocol lines. The receiver modifier circuit 210 will be described in section 8.0.

4.1 CPU to Memory Data:Signal Transfers

Figure 3A:
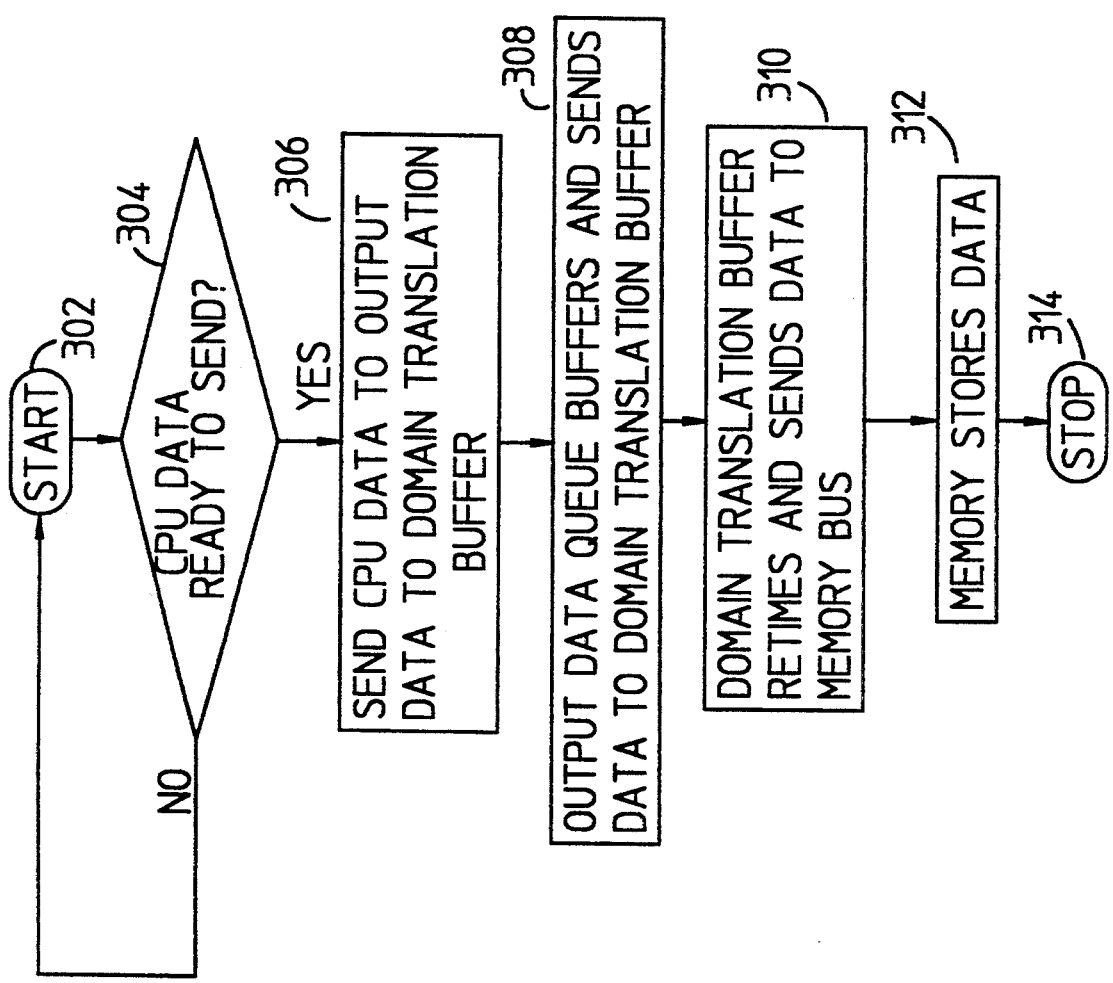
FIG. 3a illustrates a flowchart of the method of CPU to memory data transfer of the invention.

FIG. 3a illustrates a method of transferring data signals from CPU 102 operating at a first clock speed and phase, to memory unit 110, operating at a second clock speed and phase, through DCDI 206. Step 302 is the starting point for CPU 102 to memory 110 data signal transfers. Step 304 is a decision box that queries if the CPU 102 is ready to send data to memory 110 status. If the answer is 'NO', then control is transferred back to step 302 where the method is re-started. If the answer to step 304 is 'YES', the CPU 102 is ready to send data. In step 306, CPU 102 sends data to the output data queue 208. In step 308 the data is buffered in a FIFO, retimed from the higher CPU clock frequency to the lower memory bus frequency and output to domain translation buffer 216. Step 310 retirees the data signals from the phase in the output data queue to the phase of the memory bus 108. The domain translation buffer then transmits the data signals on the memory bus 208. Step 314 stores the data signals in memory 110.

4.2 Memory to CPU Data Signal Transfers

Figure 3B:
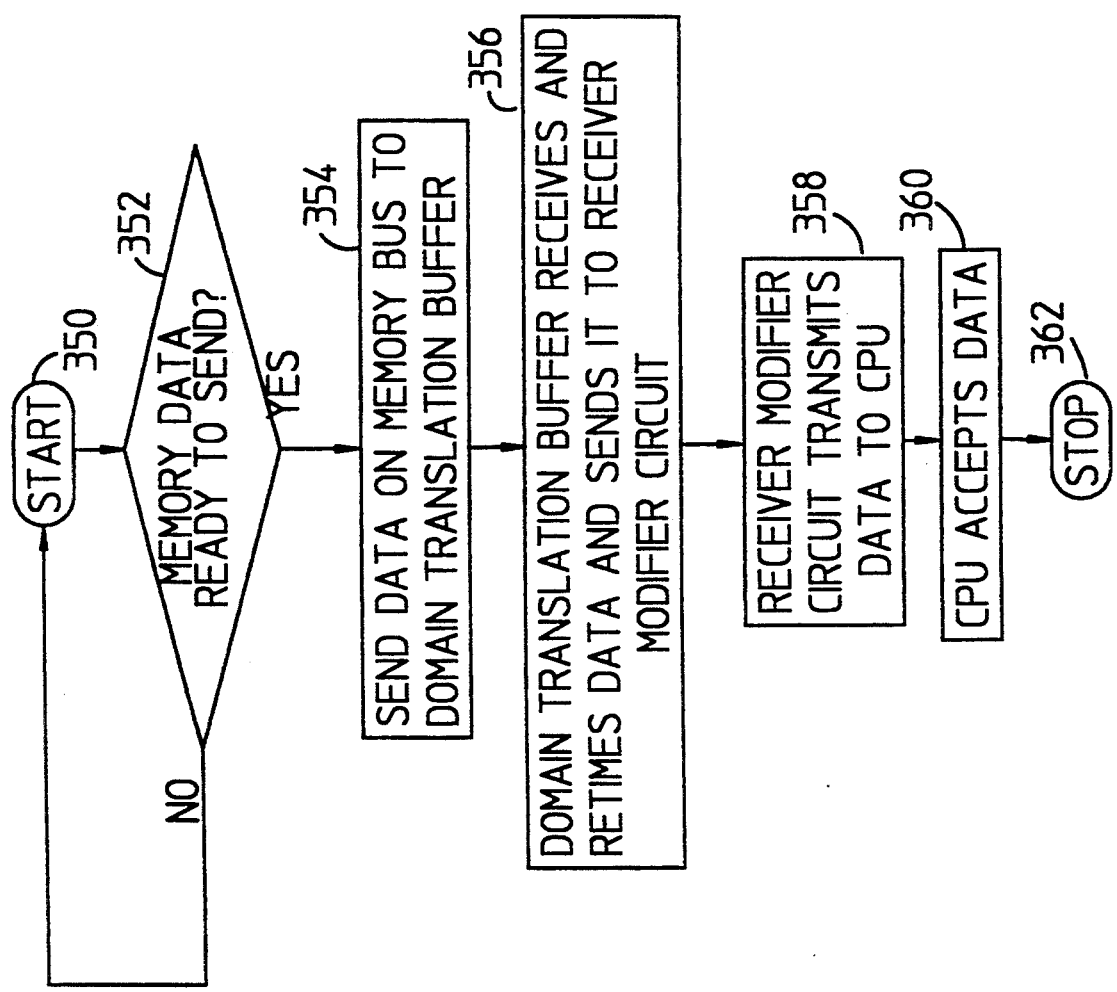
FIG. 3b illustrates a flowchart of the method of memory to CPU data transfer of the invention.

FIG. 3b illustrates the data flow from memory 110 to CPU 102, which is the opposite direction from that described in FIG. 3a. Step 350 is the starting point for memory to CPU data signal transfers. Step 352 is a decision box that queries if memory 110 is ready to transmit data signals to CPU 102. If the answer is 'NO', control is transferred back to start box 350, where the process begins again. If the answer to decision box 352 is 'YES', then in step 354 memory unit 110 transmits the selected data signals onto memory bus 108 to the domain translation buffer 216. In step 356, domain translation buffer 216 retimes the data signals, translates them to the higher CPU frequency and transmits them to receiver modifier circuit 210 on bus 206. In step 358, receiver modifier circuit 210 sends the data to CPU 102 on CPU bus 104. As described previously, the CPU 102 can accept data faster than the memory 110 can transmit, so the receiver modifier circuit 210 acts to hold the data signals to a predetermined level, inhibiting the CPU from reading invalid data signals and keeping the produced data signals at the proper consistency.

This invention is not limited to buffering CPU to memory transfers. Memory to CPU transfers could be buffered in rare cases where memory speeds exceed CPU speeds. This invention could also be extended to memory device to memory device transactions, CPU to CPU transactions or peripheral to peripheral transactions or any combination thereof. Further, the ratio is not limited to N:2. Any ratio of N:M, where N and M are integers is within the scope of this invention.

The hardware elements of DCDI 106 will be described in more detail in the following sections below.

5.0 Domain Translation Buffer

The domain translation buffer 216 will now be explained in greater detail with reference to FIGS. 4a and 4b.

Figure 4A:
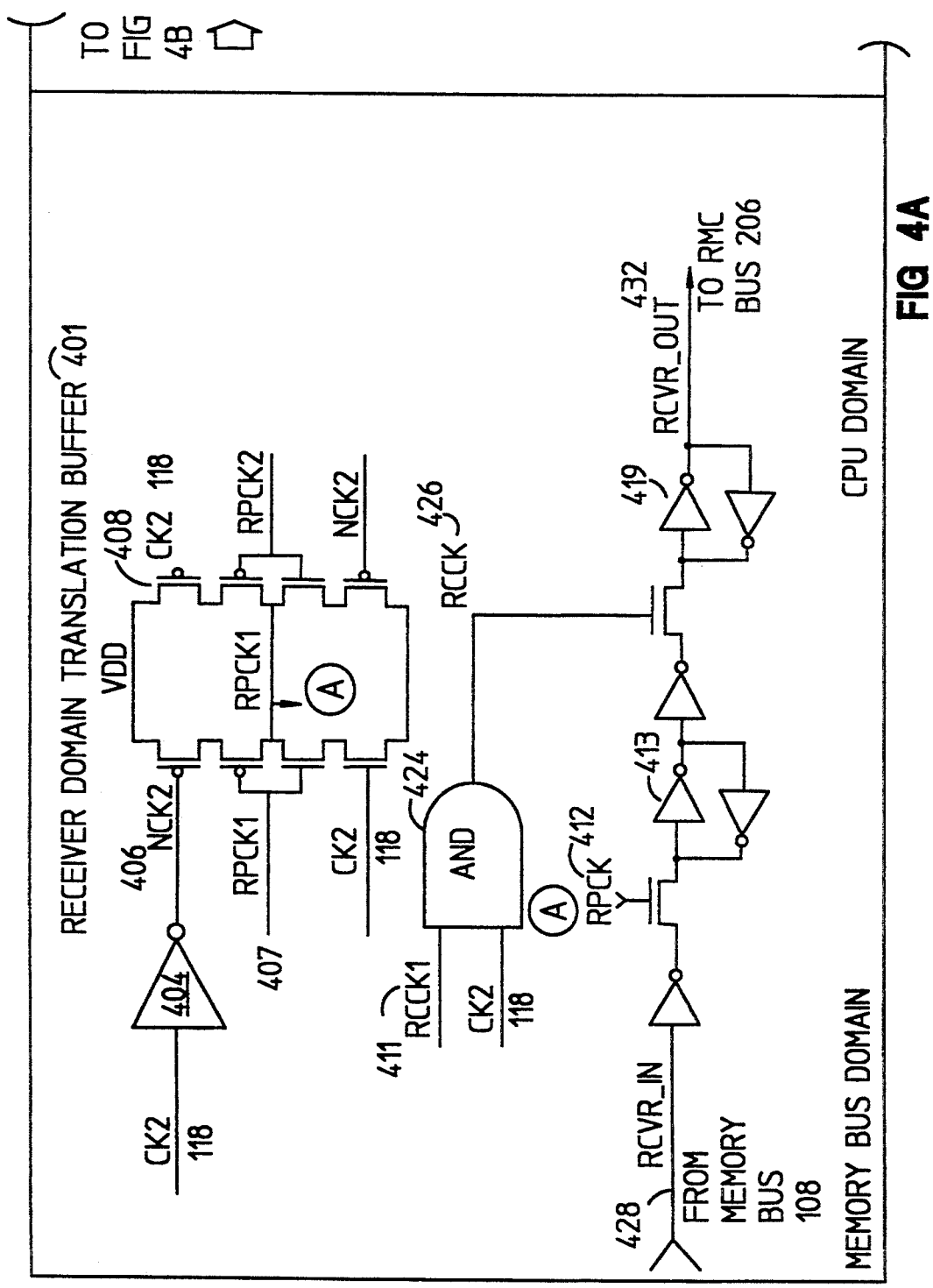
FIG. 4a illustrates a schematic diagram of a receiver domain translation buffer.
Figure 4B:
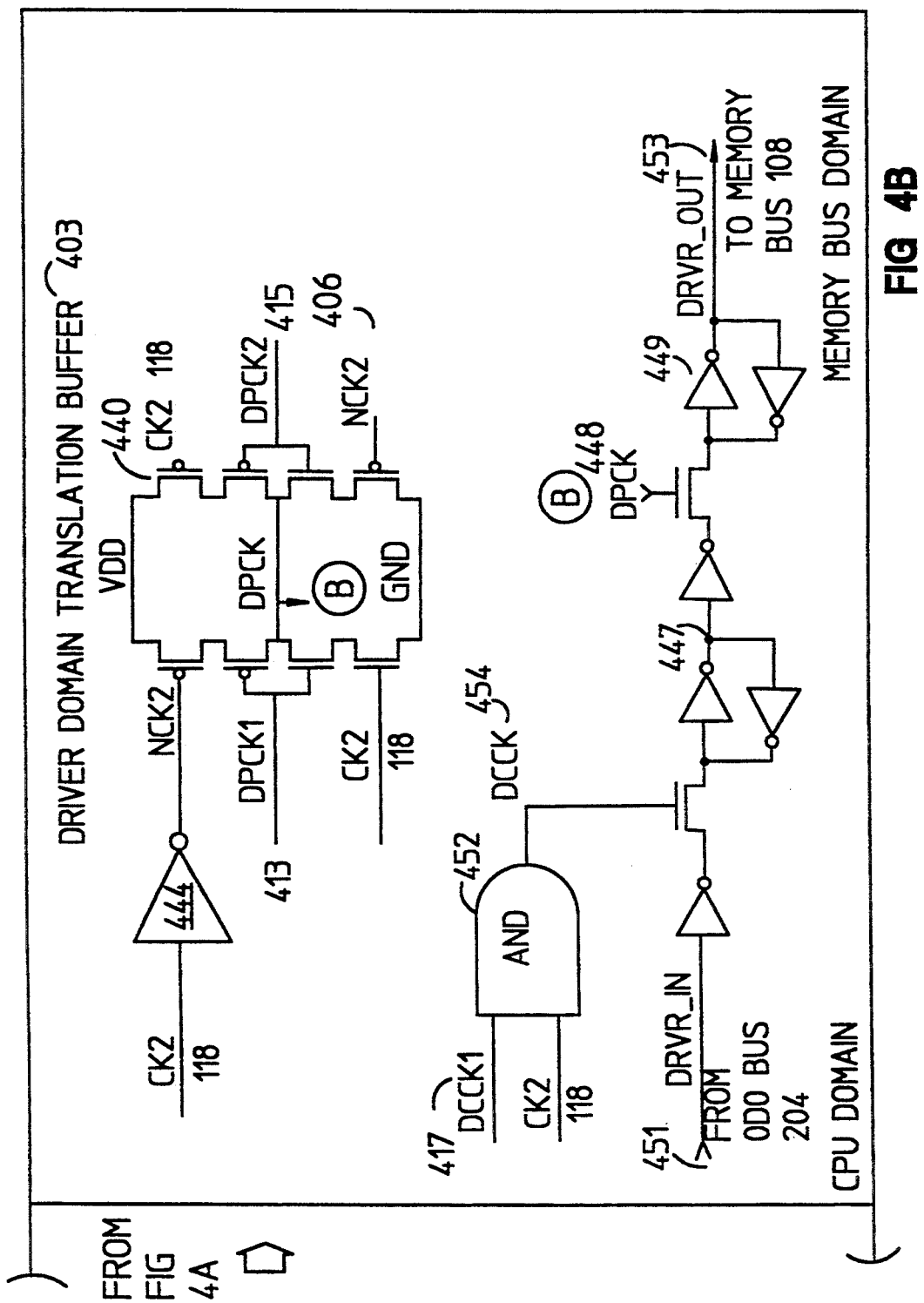
FIG. 4b illustrates a schematic diagram of a driver domain translation buffer.

FIGS. 4a and 4b illustrate schematic diagrams of the domain translation buffers 401, 403. All DCDI 106 signal transitions are triggered by the CPU clock signal CK2 118. In general terms, a receiver 401 is a buffer which clocks data into the CPU 102 from the memory bus 108. A driver 403 takes data from the CPU 102 and drives it onto the memory bus 108. A domain translation buffer 216 takes data from one clock domain and "translates" it into another clock domain. This is accomplished using special clock signals (defined for each domain) which depend on the direction a signal is propagating. There are four domain translation clocks shown in FIG. 4a and 4b defined as follows: RPCK 4 12 is the receiver memory bus domain clock; RCCK 426 is the receiver CPU domain clock; DCCK 454 is the driver CPU domain clock; and DPCK 448 is the driver memory bus domain clock. Such domain translation clocks are generated locally to each bit of the bus in order to minimize timing skew between bits.

Turning now to FIG. 4a, the receiver portion 401 of domain translation buffer 216 will now be discussed. The receiver portion 401 functions as a buffer which clocks data into the CPU 102 from the memory bus 108. Memory bus signals 428 are clocked into the receiver domain translation buffer 401 when RPCK 4 12 goes high. These signal are translated into the CPU domain by clocking them with RCCK 426. The circuit 408 which generates RPCK 412 embodies the DCDI's capability of handling frequency ratios of N:2. This circuit 408 allows memory bus data to be received on, optionally, the rising or falling edge of CK2 118.

Input CK2 118 is gated by clock signals RPCK2 409 and RPCK1 407 in a network of transistors 408 to produce clock signal output RPCK 412. RPCK 412 is used to clock data signals 428 from memory bus 108 into domain translation buffer 216. Clock signal RCCK1 411 is logically combined in AND gate 424 with CK2 118 to produce clock signal RCCK 426. RCCK 426 is used to gate the memory bus signal 428 into RCVR_OUT 432 terminal for output into the CPU domain on bus 206. Looking now at FIG. 4b, the driver portion of the domain translation buffer will now be discussed. The driver portion functions as a buffer which clocks data onto the memory bus 108 from CPU 102. Clock signal DCCK1 417 is logically combined in AND gate 452 with CK2 118 to produce clock signal DCCK 454. DCCK 448 is used to clock data signals 45 1 from output data queue bus 204 into domain translation buffer 216. Input CK2 118 is gated by clock signals DPCK2 413 and DPCK1 415 in a network of transistors 440 to produce clock signal output DPCK 448. DPCK 454 is used to gate the signals 447 into DRVR_OUT 449 terminal for output to memory bus 108.

The circuit 440 which generates DPCK 448 embodies the DCDI's capability of handling frequency ratios of N:2. This circuit 440 allows memory bus data to be driven on, optionally, either the rising or falling edge of CK2 118.

6.0 Clock Control Circuit

The clock control circuit will now be explained in greater detail with reference to FIGS. 5a, 5b, 5c, 6, 7, 8a, 8b and 8c.

The clock control circuit 214 is designed to accommodate the CPU to memory bus frequency ratios of 1:1, 3:2, and 2:1. Other ratios may be accommodated with minor modifications.

Figure 5A:
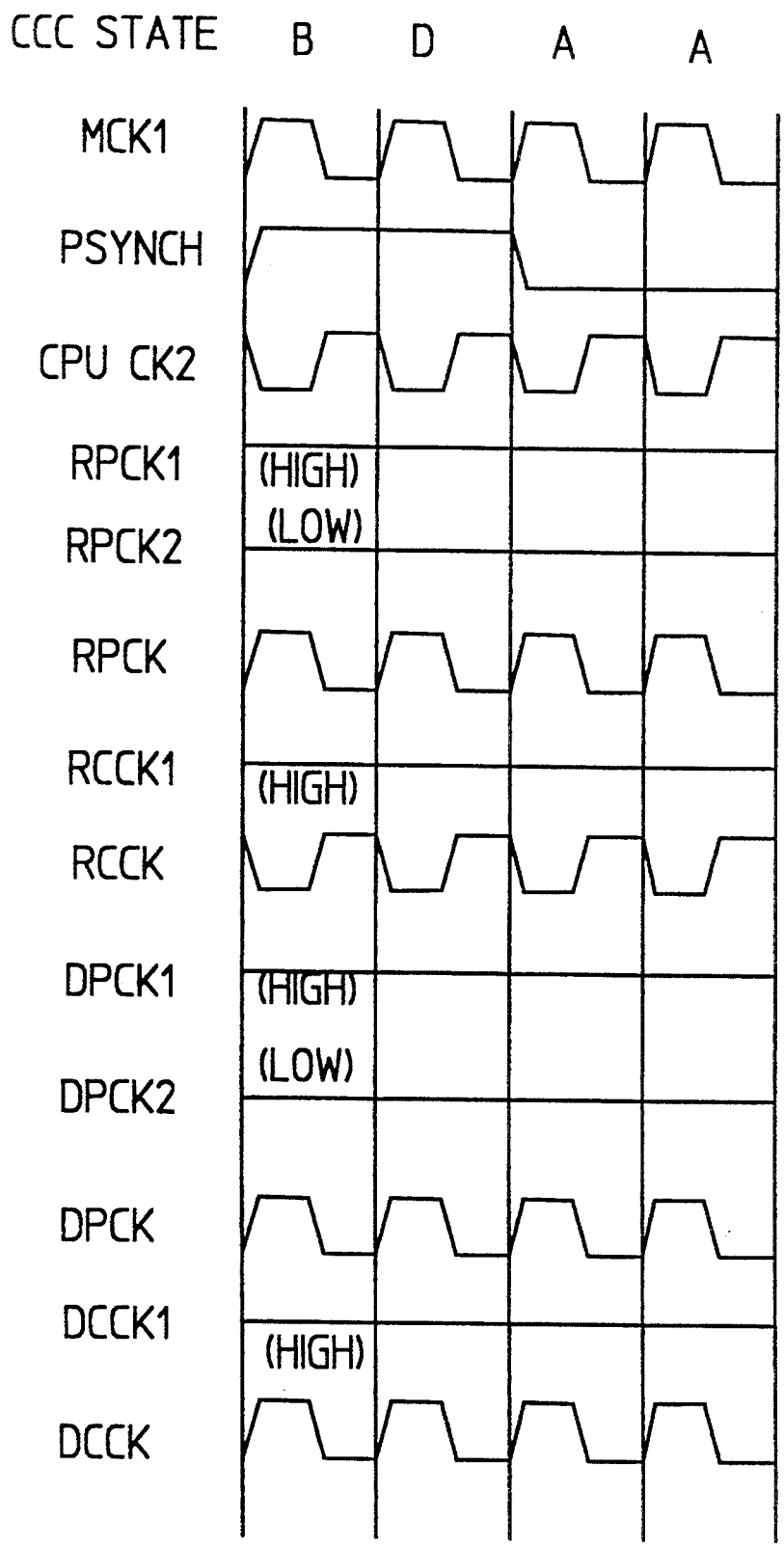
FIG. 5a illustrates a timing diagram of the domain translation clock timing with a CPU clock/memory clock ratio of 1:1.
Figure 5B:
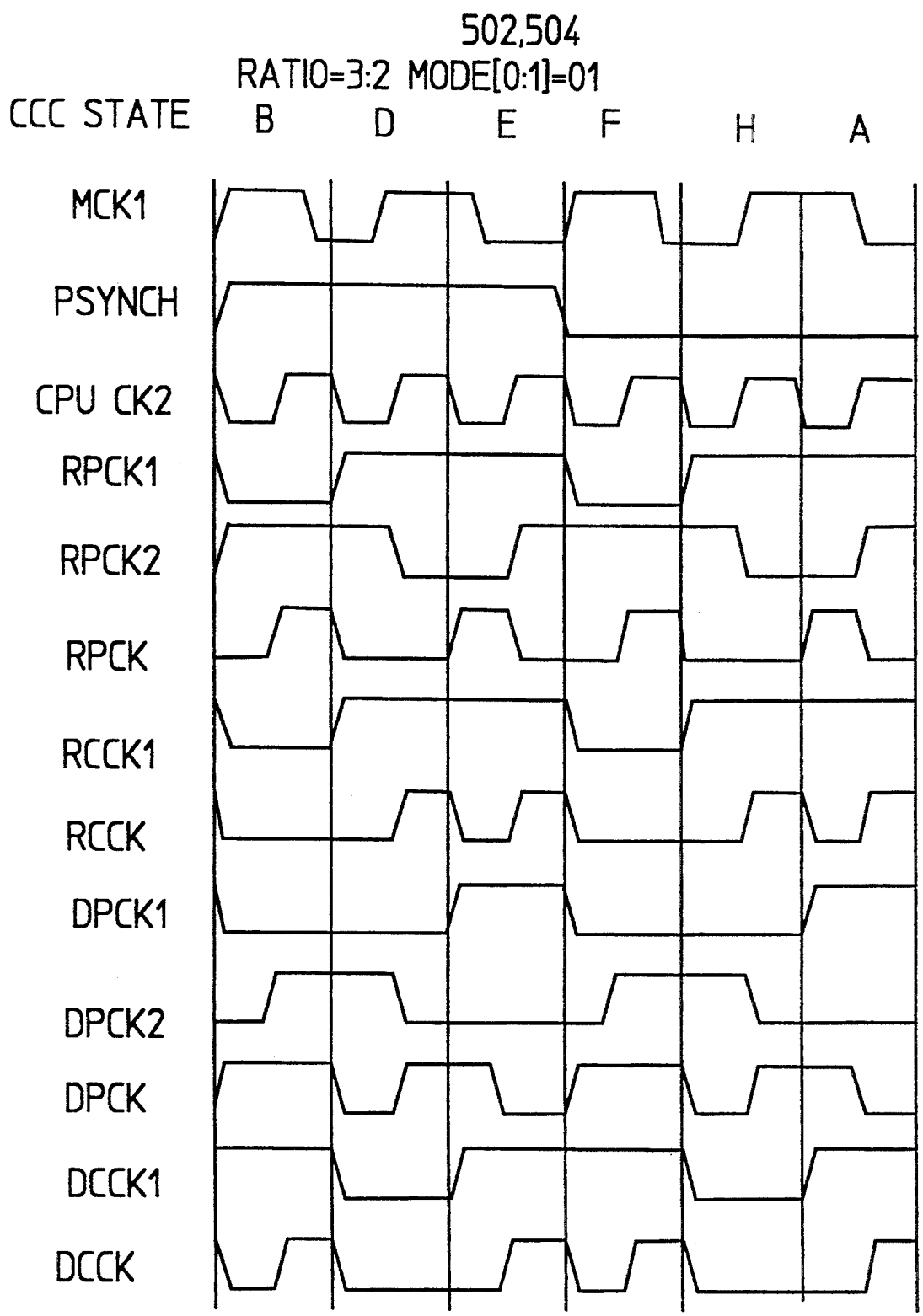
FIG. 5b illustrates a timing diagram of the domain translation clock timing with a CPU clock/memory clock ratio of 3:2.
Figure 5C:
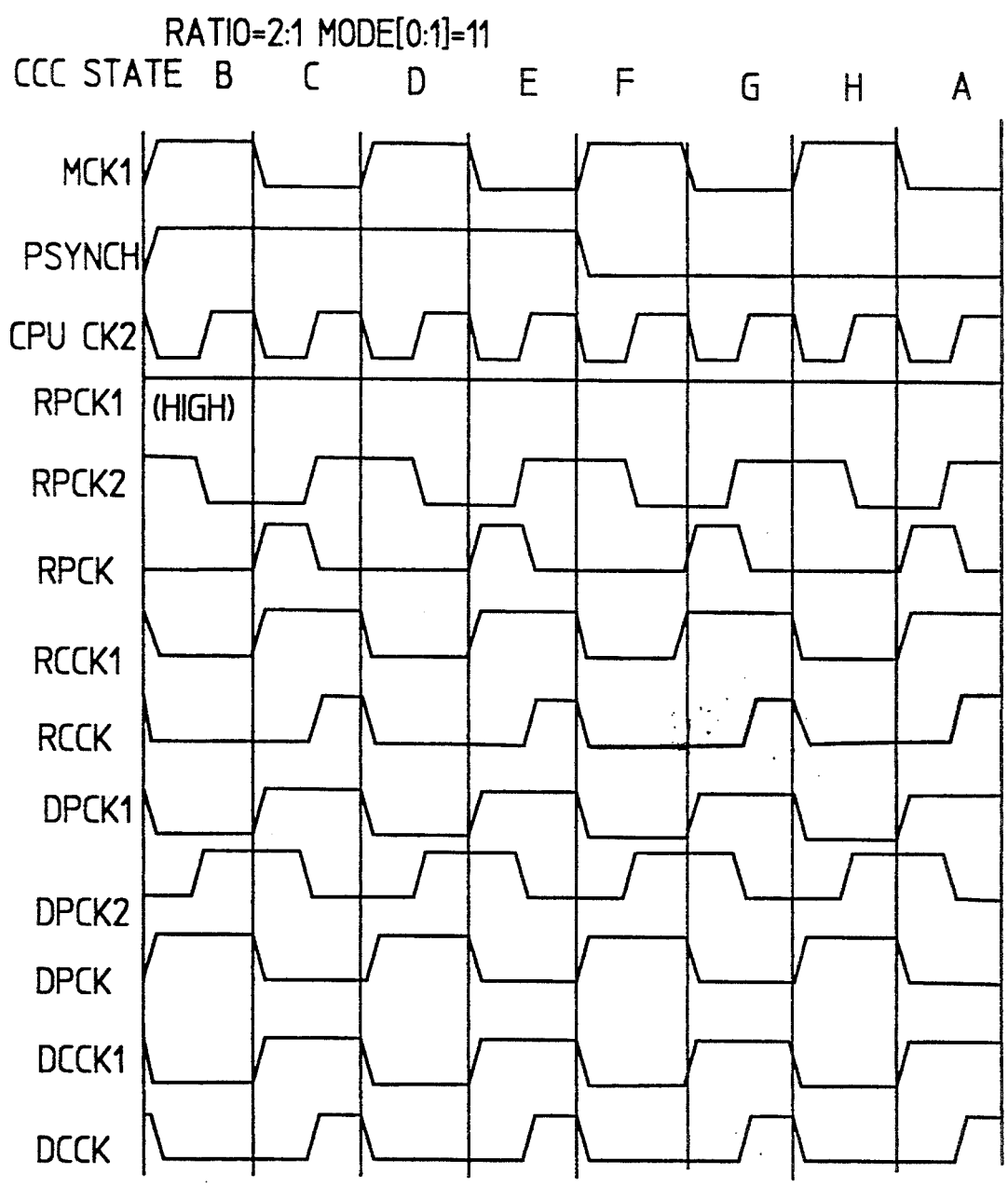
FIG. 5c illustrates a timing diagram of the domain translation clock timing with a CPU clock/memory clock ratio of 2:1.
Figure 7:
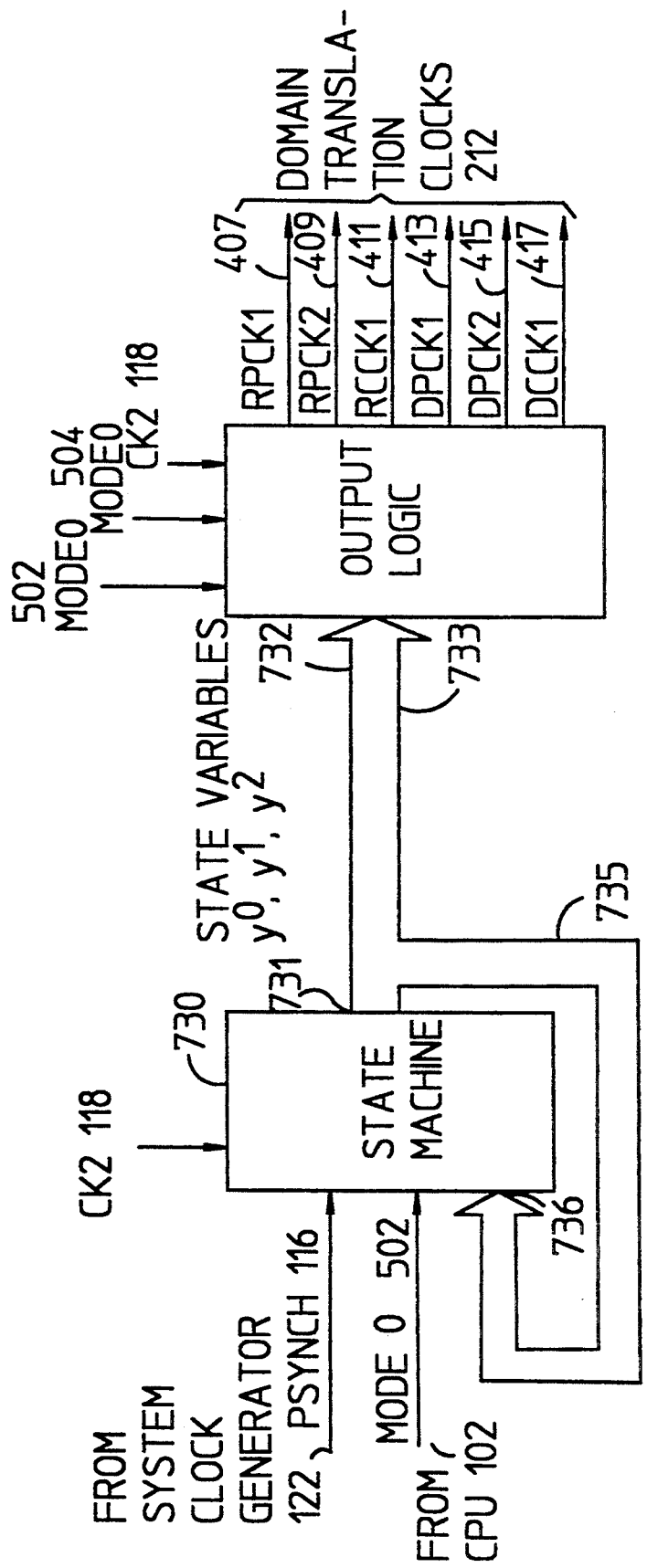
FIG. 7 illustrates a block diagram of the clock control circuit.
Figure 8A:
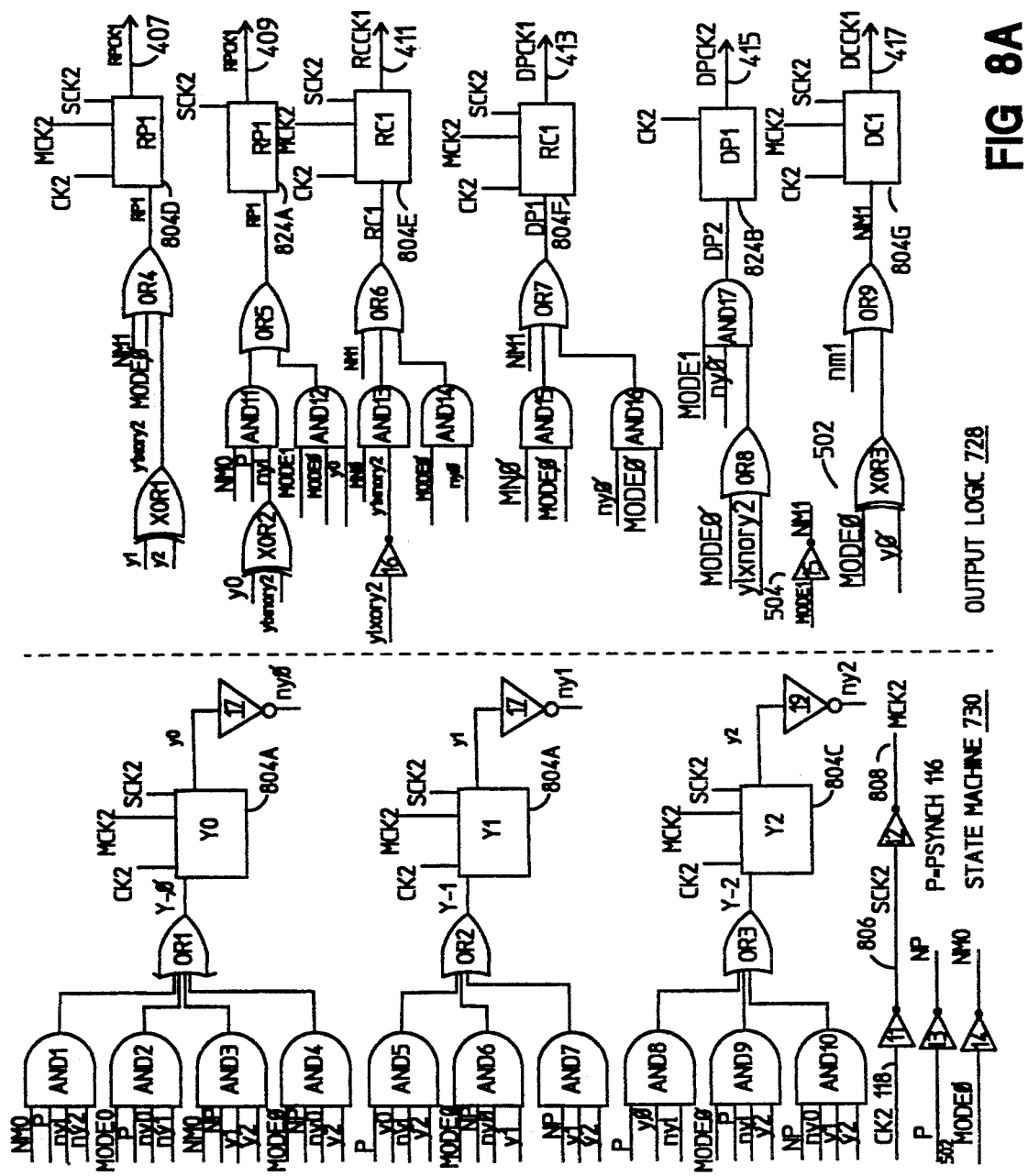
FIG. 8a illustrates a schematic diagram of the clock control circuit.
Figure 8B:
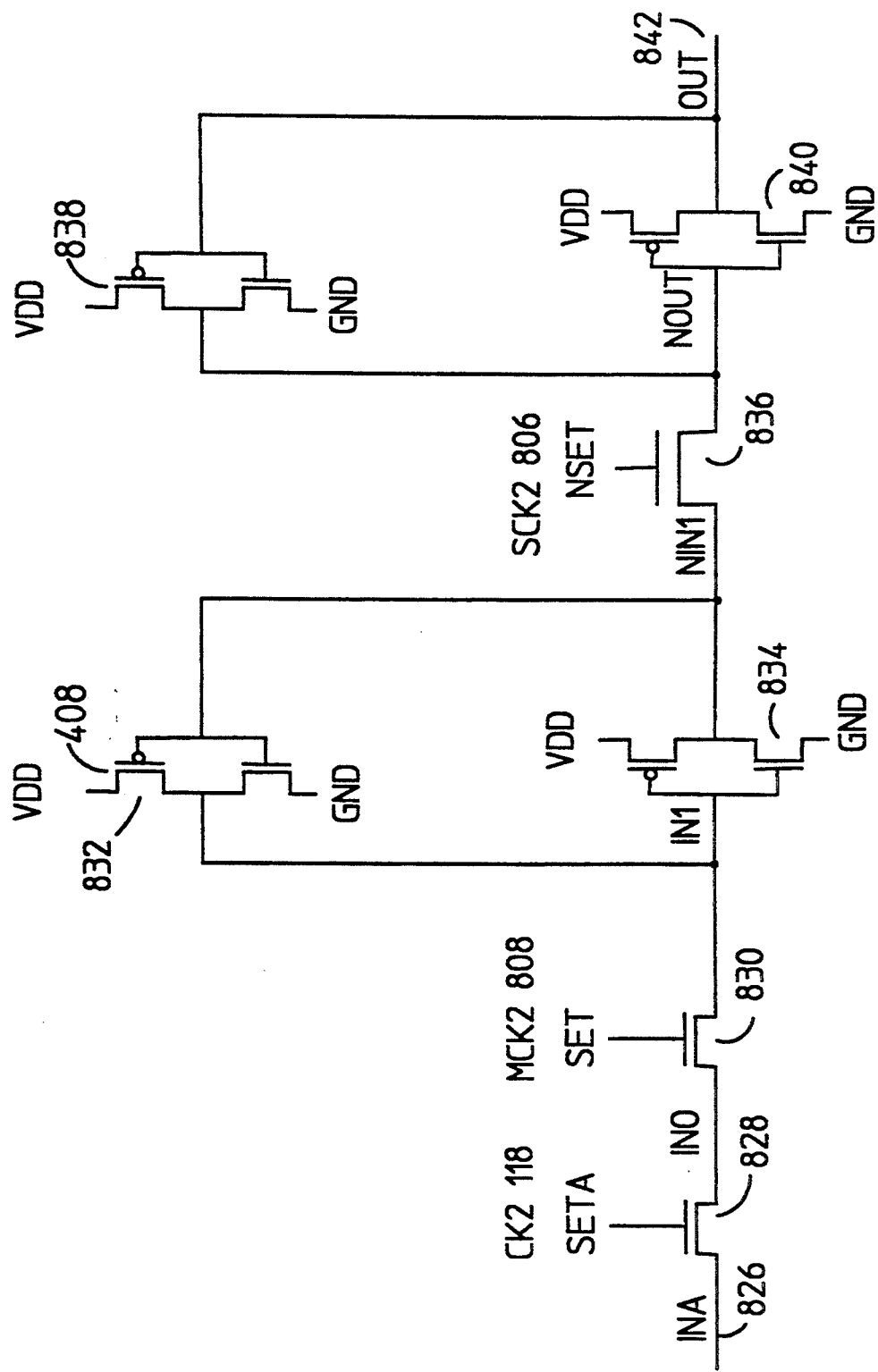

FIGS. 5a, 5b, and 5c illustrate timing diagrams of clock control circuit 214 for the three ratios and will be referred to during the subsequent descriptions of the block diagram of FIG. 7 and the schematic diagrams of FIGS. 8a and 8b.

While the domain translation clock signals RPCK 412, RCCK 426, DPCK 448, and DCCK 454 are generated locally within each domain translation buffer 216 (one for each bit of the memory bus 108), a set of global domain translation clock control signals are generated by the clock control circuit 214. The clock control circuit generates RPCK1 407, RPCK2 409, RCCK1 411, DPCK1 413, DPCK2 415, and DCCK1 417 according to the current frequency ratio of the system. The clock control circuit is designed to produce these waveforms as shown in FIGS. 5a, 5b and 5c and is implemented as a simple 8-state state machine. All waveform information shown in FIGS. 5a, 5b and 5c can be derived from an encoding of the state information of an 8-state state machine given the inputs PSYNCH and some encoding of the frequency ratio.

The clock control circuit uses CPU CK2 118 as its synchronous state machine clock. Its inputs are PSYNCH 116 and two mode bits 502, 504 which encode the frequency ratio. PSYNCH 116 is defined to be a 50% duty clock signal which has a frequency of one-fourth that of the memory bus clock and whose rising edge occurs when the rising edges of CPU CK1 119 and memory bus clockMCK1 are coincident. PSYNCH 116 is simple to generate in the system clock generator 112, and having a single clock signal based on the memory bus eliminates the need to import multiple memory bus clock lines onto the processor chip 114. The mode bits are defined such that MODE[0:1]=00 implies a ratio of 1:1, 01 implies 3:2, and 11 implies 2:1. MODE1=0 504 alone indicates 1:1, during which operation the clock control circuit outputs are static. Therefore, the clock control circuit state machine need not depend on that input. When MODE1=0 504 the clock control circuit outputs are pulled high or low as shown in FIG. 5a.

Figure 6:
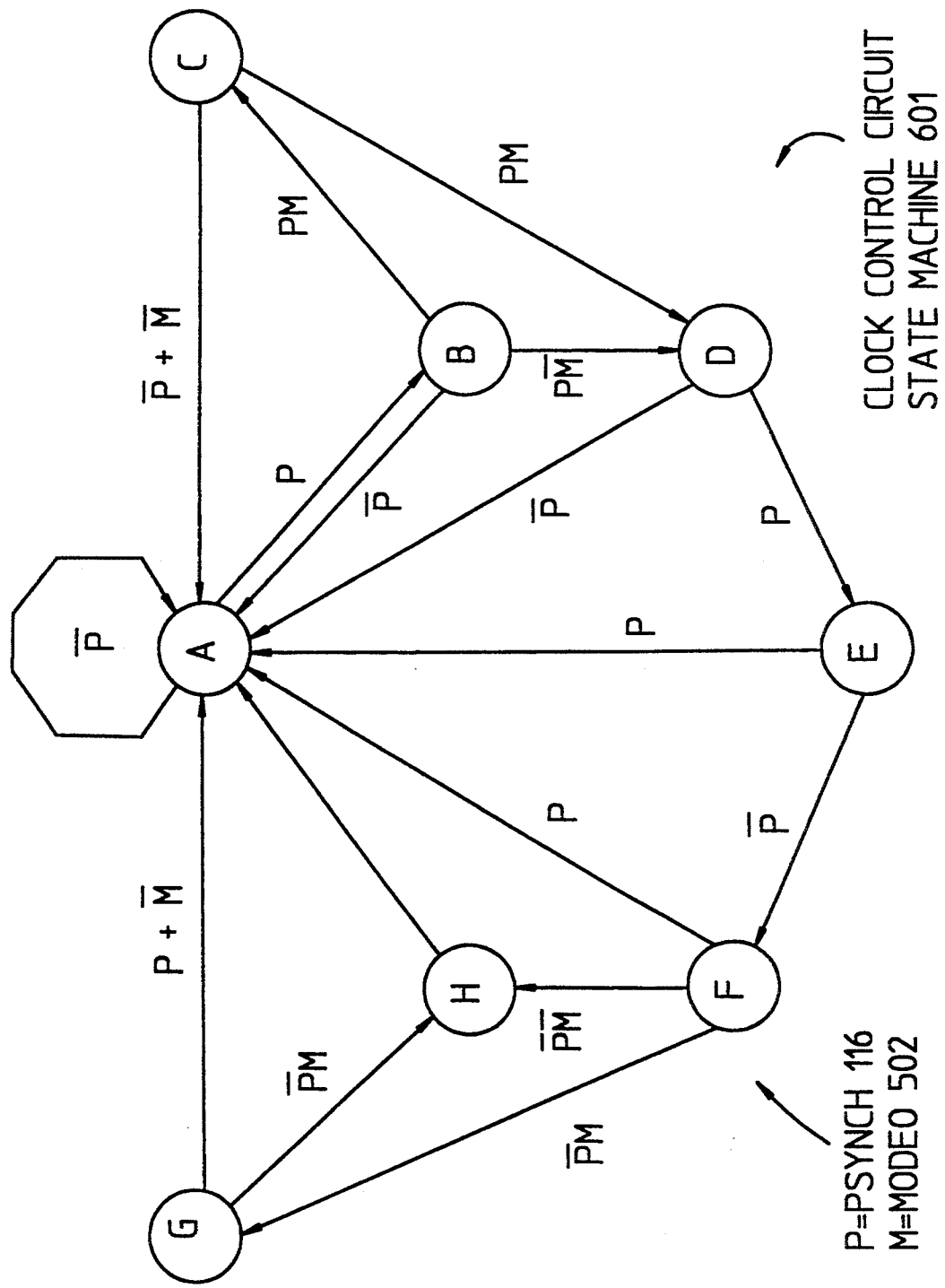
FIG. 6 illustrates a state diagram of the clock control circuit.

FIG. 6 illustrates a state machine diagram illustrating the clock control circuit 214 operation for 3:2 and 2:1 ratio modes. States are represented by the letters A-H. Transitions between states are triggered by a rising CK2 118 edge. The next state at any particular moment is determined by the combination of PSYNCH 116 (denoted as P in FIG. 6) and MODE0 502 (denoted as M). For example, if the state machine is in state C and PSYNCH 116 and MODE0 502 are both high (logical 1), then the next state will be state D. Otherwise the next state will be A. Some state transitions depend only on the logic level of PSYNCH 116. The state machine states A–H in FIG. 6 correspond to those CPU states marked in FIGS. 5a, 5b and 5c as "CCC state."

FIG. 7 illustrates a block diagram of the clock control circuit 214. It is composed of the state machine 730 which encodes the operation of the state diagram in FIG. 6 and a block of output logic 728 which generates the global domain translation clocks. State variables y0, y1, and y2 encode the current state of the state machine. The clock control circuit 214 outputs are simply a function of which state the clock control circuit state machine 730 is in and the frequency ratio (mode).

FIG. 8a illustrates a detailed circuit schematic of the clock control circuit 214 block diagram. Clock control circuit 214 is comprised of state machine 730 and output logic 728. The inputs to the state machine 730 are the two mode signals MODE0 502, MODE1 504, PSYNCH 116 and CK2 118. The inputs are fed into a series of ten AND gates which are then logically combined in three OR gates as shown in FIG. 8a. The outputs of the three OR gates are then fed into state registers Y0–Y2 804. The outputs of those registers 804 are then returned to the inputs of 730 via feedback loop 735. The storage elements labeled Y0, Y1, Y2 are master-slave registers that hold the state variable information. The combinational logic 730 computes the next state when CK2 118 goes low. When CK2 118 goes high, the state machine transitions to the next state. The output signals 407, 409, 411, 413, 415 and 417 in output logic 728 are held steady for each state by latches 804D–804G, 824A and 824B, which allows the signals to change levels on the appropriate clock edge (as can be seen in FIG. 5). The combinational logic 728 computes the next output signal levels based on the current levels of the state variables y0, y1 and y2 (i.e., the current state of the state machine 730) and the mode bits 502, 504.

Figure 8C:
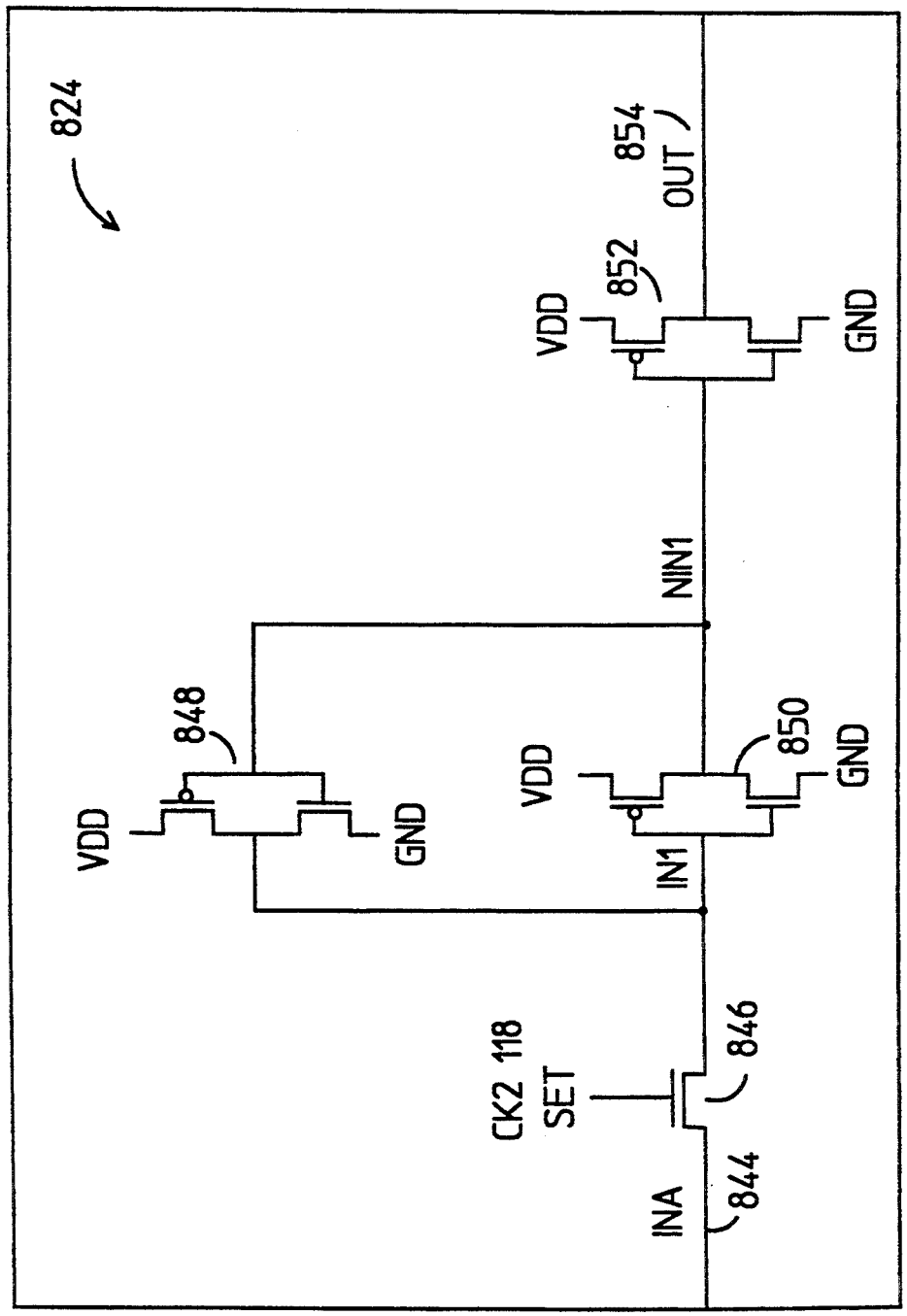

FIG. 8b is a detailed schematic diagram of latch 804. FIG. 8c is a detailed schematic diagram of latch 824. Those skilled in the art will recognize that the latches in FIGS. 8b and 8c act to buffer their inputs, and retime them for appropriate output to the system.

7.0 Output Data Queue

The output data queue 208 will now be described with reference to FIGS. 9a and 9b. Since CPU 102 may generate data to be driven onto the memory bus 108 at a faster rate than the memory bus 108 can accommodate, an output data queue 208 is required.

Figure 9A:
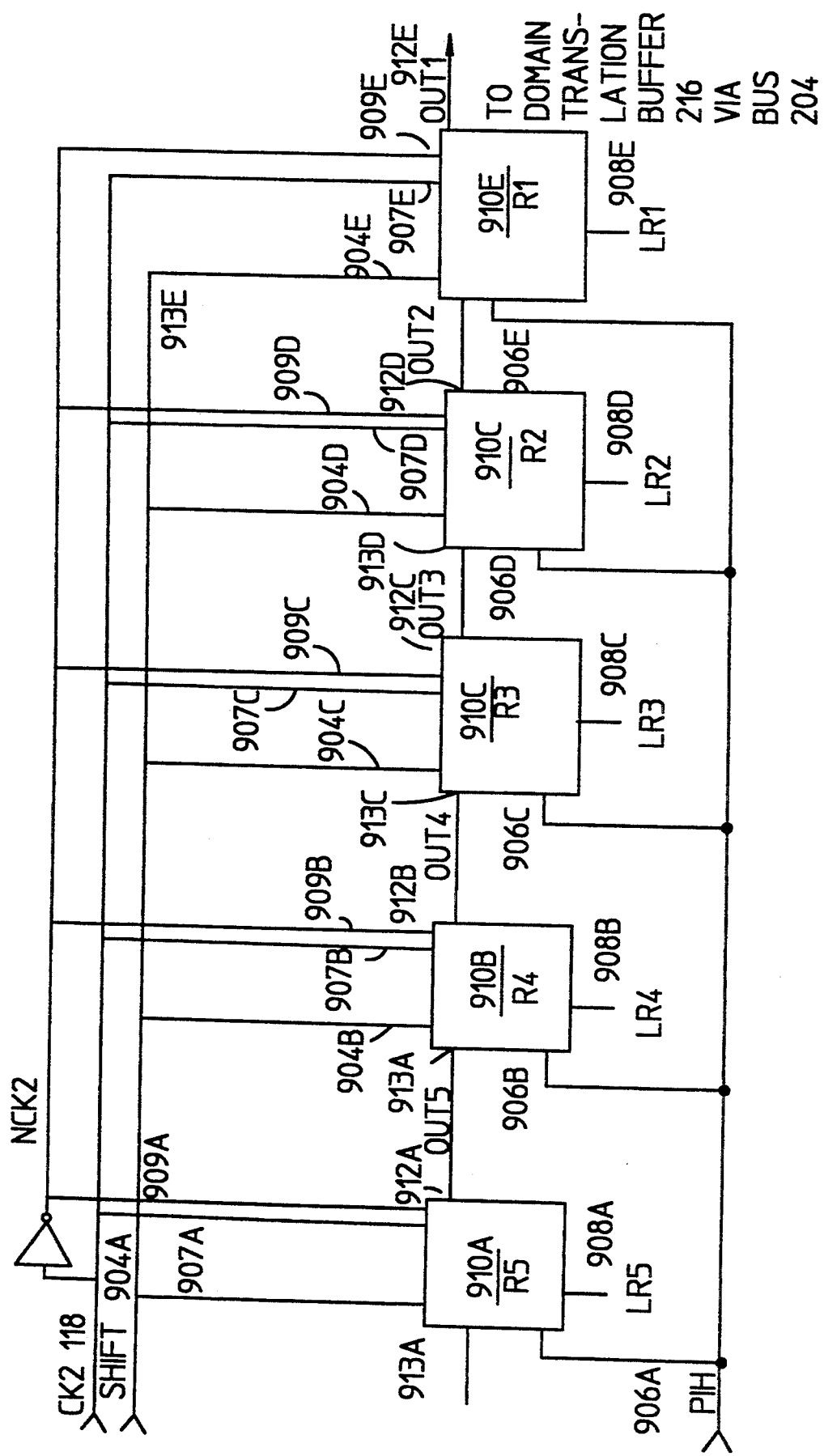
FIG. 9a illustrates a schematic diagram of the output data queue.
Figure 9B:
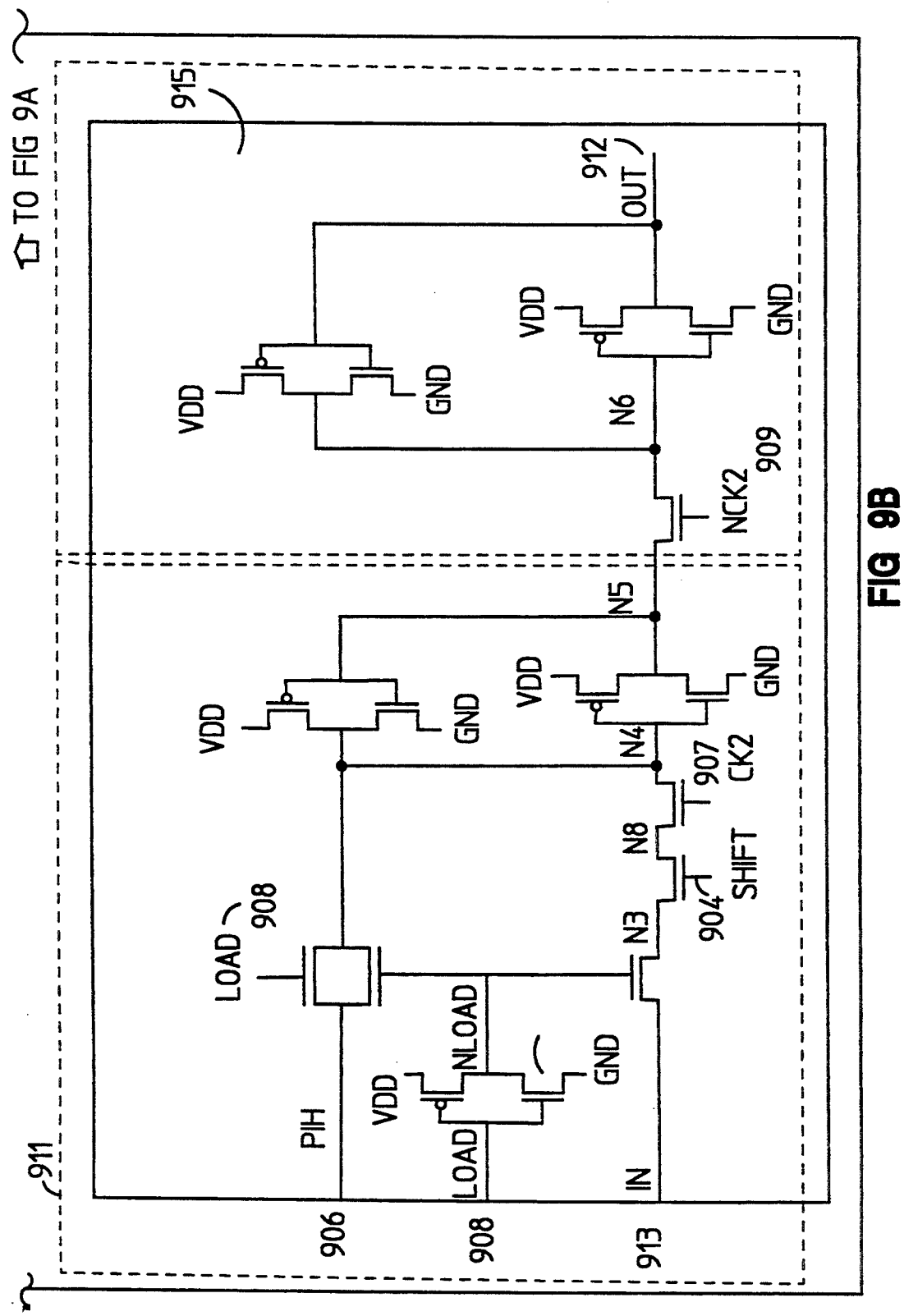

FIG. 9a illustrates a schematic diagram of the output data queue 208. The objective of the output data queue 208 is to store data temporarily while waiting for DCCK states (i.e. CPU states during which DCCK has a high pulse as shown in FIGS. 5a, 5b and 5c). The output data queue 208 stores data to be driven onto the memory bus 108 in a first-in-first-out fashion and is designed to be large enough to handle the longest expected transfer at the highest frequency ratio. The longest expected memory bus transaction is a data transfer of 10 words (the size of a data cache line in the preferred embodiment), and the highest ratio between CPU and memory bus speeds is 2:1. This highest ratio requires the output data queue 208 to have 5 storage elements 910, of which each element is a master-slave latch with two data signal inputs. Each latch has one input for reading data from the CPU and one for shifting data along the queue, as well as an enable input for each data input. Data arriving at the DCDI 106 at CPU frequency is loaded into the appropriate latch 910 in the queue depending on which word in the transaction it is and the ratio mode. Incoming data arrives on the input PIH line 906 which connects to each of the latches 910 in output data queue 208. Control lines LR[1:5] 908 select which output data queue latch gets loaded with the current PIH data. The Shift signal 904 input enables shifting data serially along the queue on outputs 912A–912E.

Figure 10:
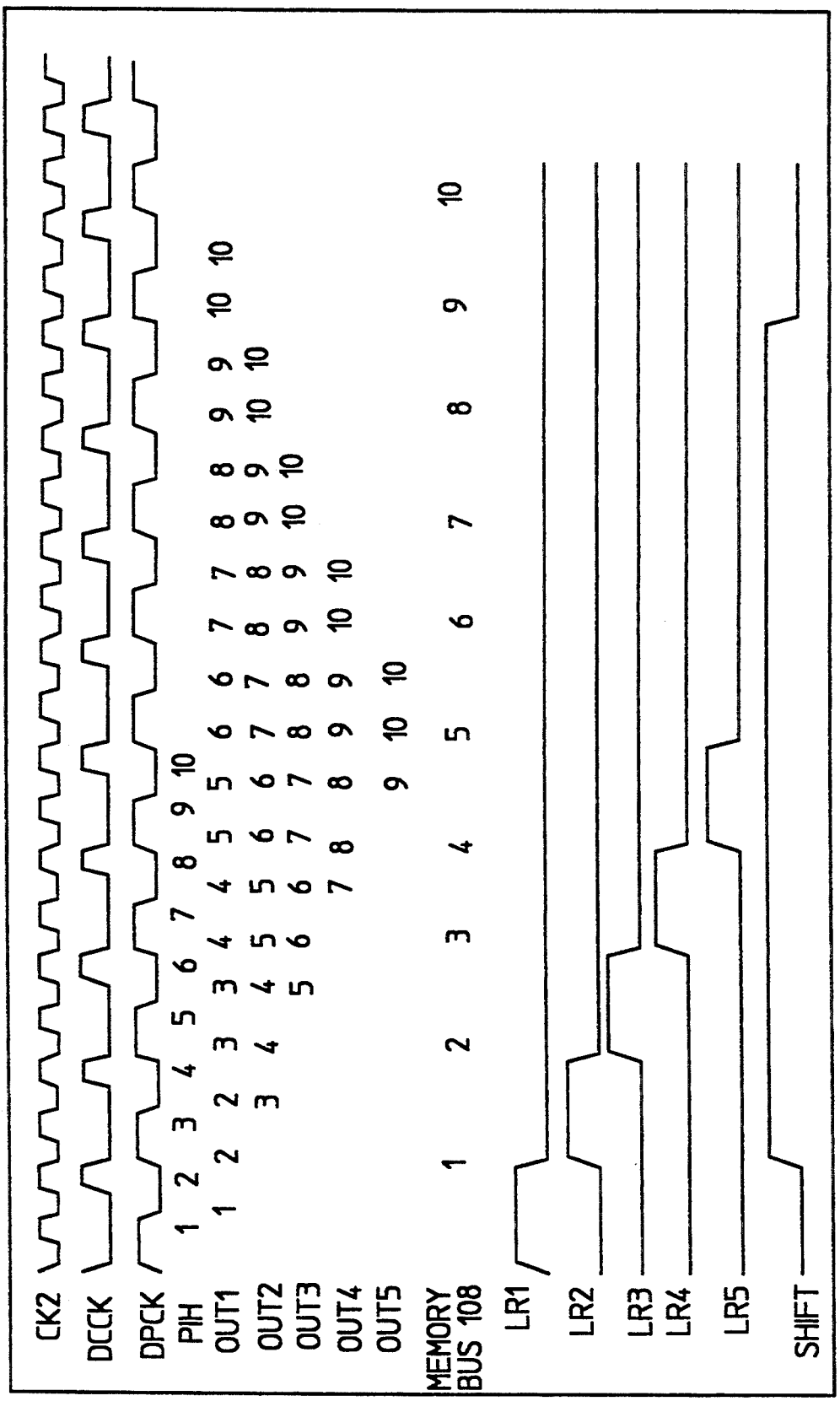
FIG. 10 illustrates a timing diagram of the output data queue operating at a CPU/memory clock ratio of 2:1.

FIG. 10 illustrates an example of how the output data queue works for a 10 word transaction at a frequency ratio of 2:1. The signal levels on the PIH 906 line can be tracked as the signal flows through the output data queue 208. As the PIH data is clocked through the output data queue 208, the appropriate signal arrives at the output 912A–912E of each latch 910A–910E. Upon the transition of CK2 118, domain translation buffer 216 accepts the data at the memory bus speed from the output data queue 208. Those skilled in the art will recognize that there are many ways to implement this timing system without departing from the scope of this invention.

8.0 Receiver Modifier Circuit

The receiver modifier circuit 210 will now be explained in more detail with reference to FIGS. 11a, 11b and 11c. The receiver modifier circuit 210 provides the CPU 102 with appropriate signal values during CPU states when valid memory bus data is not available. In the 2:1 operating mode, valid memory bus signals are available only every other CPU state. In 3:2 mode, only two out every three CPU states have valid data. In order to isolate the CPU 102 from the slower signal rate of the memory bus and to maintain signal consistency, the receiver modifier circuit fills in such "empty" states. The receiver modifier circuit 210 is used for the protocol portion of the memory bus and is implemented in three different ways. Some memory bus 108 protocol signals should be held at the value they had during the previous state. Others, such as "data valid" bits, should return to a logical 0 value. Still others, such as "bus busy" bits, should return to a logical 1 value. The receiver modifier circuits which embody these three modes of operation are illustrated in FIGS. 11a, 11b and 11c.

Figure 11A:
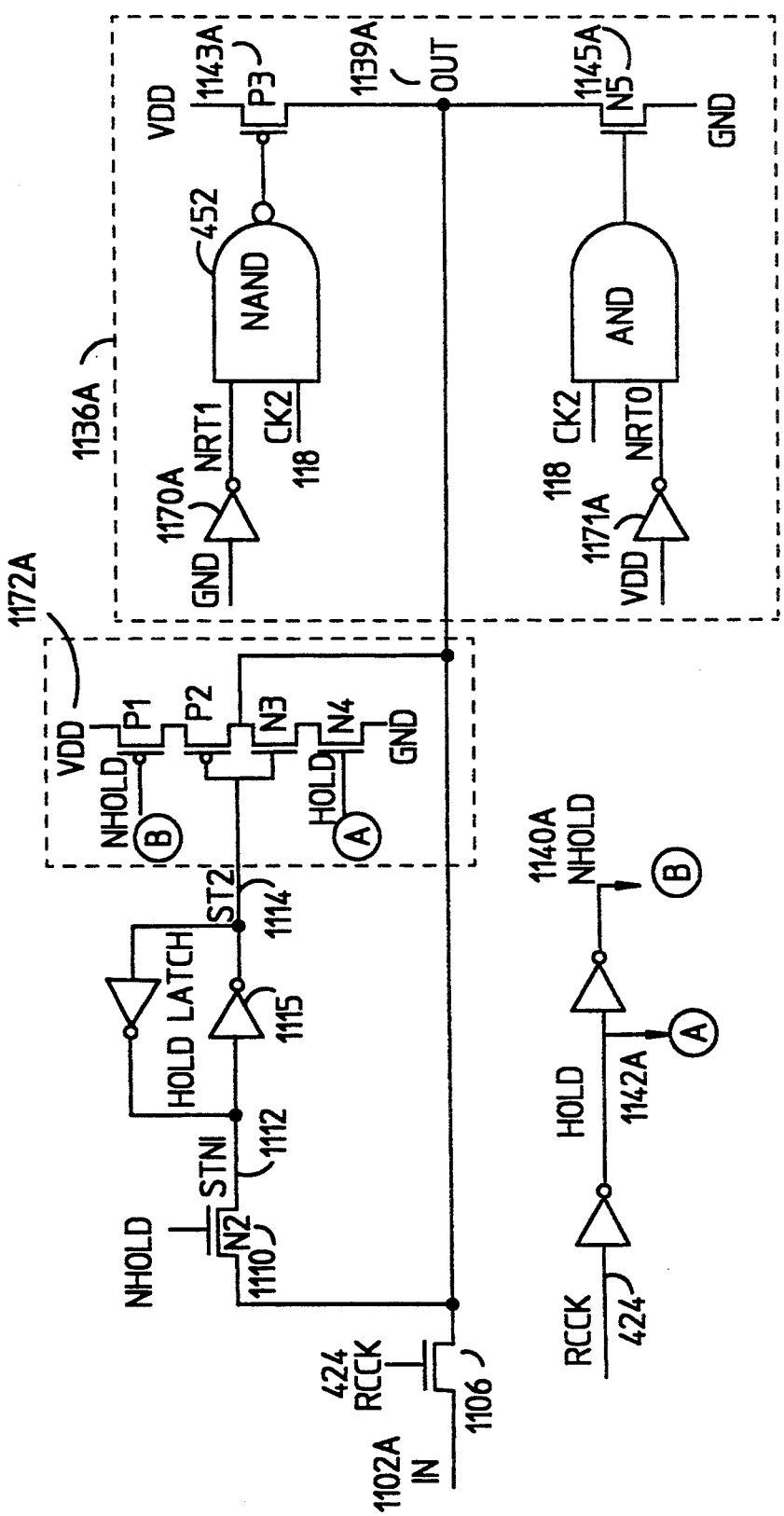
FIG. 11a illustrates a schematic diagram of a receiver modifier circuit configured in 'hold previous value' usage.

FIG. 11a shows a receiver modifier circuit wired to perform the "hold previous value" function. When RCCK 424 goes high, the receiver output 1102 (from the Receiver Domain Translation buffer via bus 206) is passed directly through the circuit unmodified through transistor N1 while the hold latch is loaded through transistor N2. Circuit nodes STN1 1112 and ST2 1114 hold the value when RCCK 424 goes low, at which time the signal HOLD 1142 goes high, so that the output is driven from the hold latch. The input connectivity of the NAND and AND gates for this form of usage disables the modifier transistors P3 and N5.

Figure 11B:
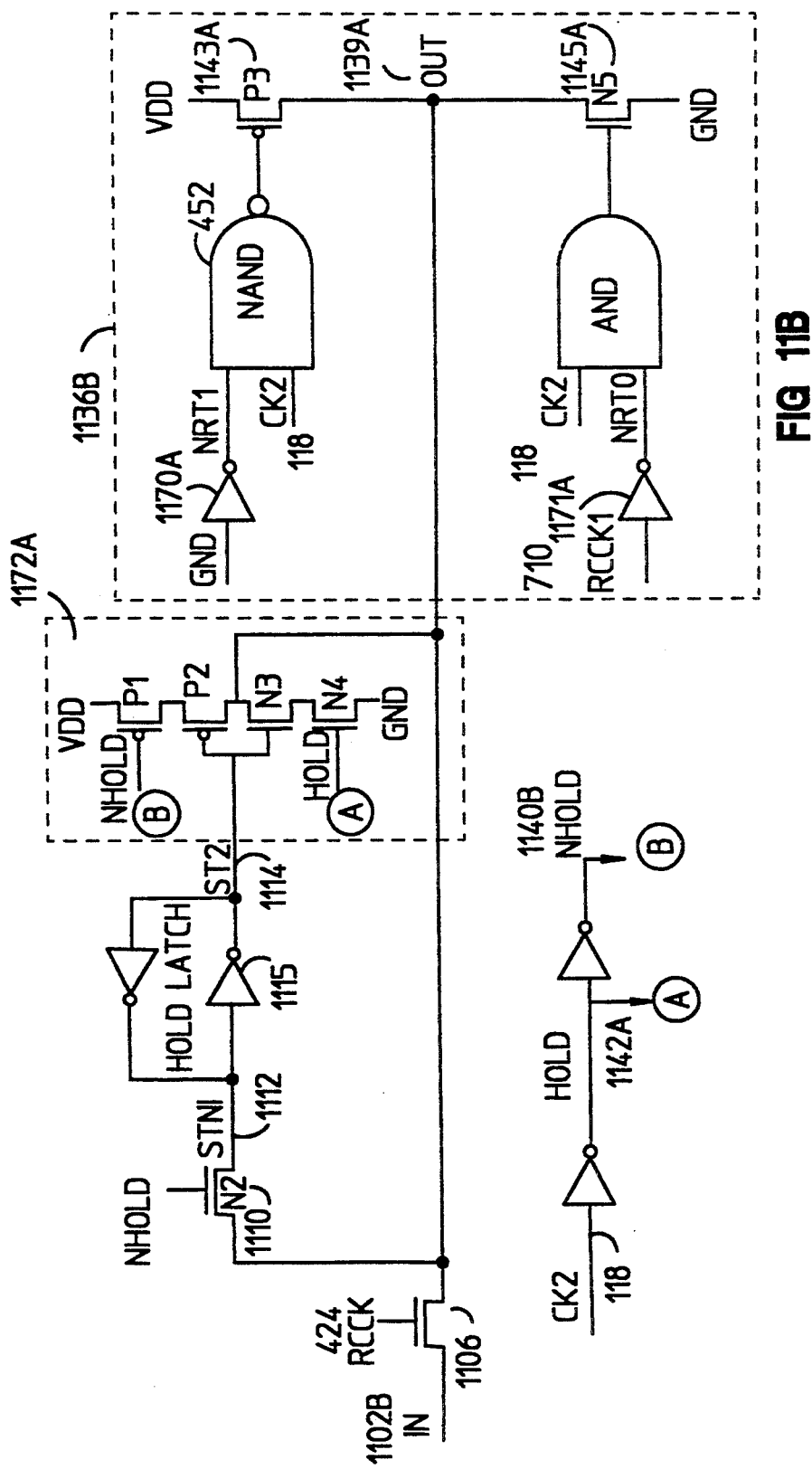
FIG. 11b illustrates a schematic diagram of a receiver modifier circuit configured in 'return to zero' usage.
Figure 11C:
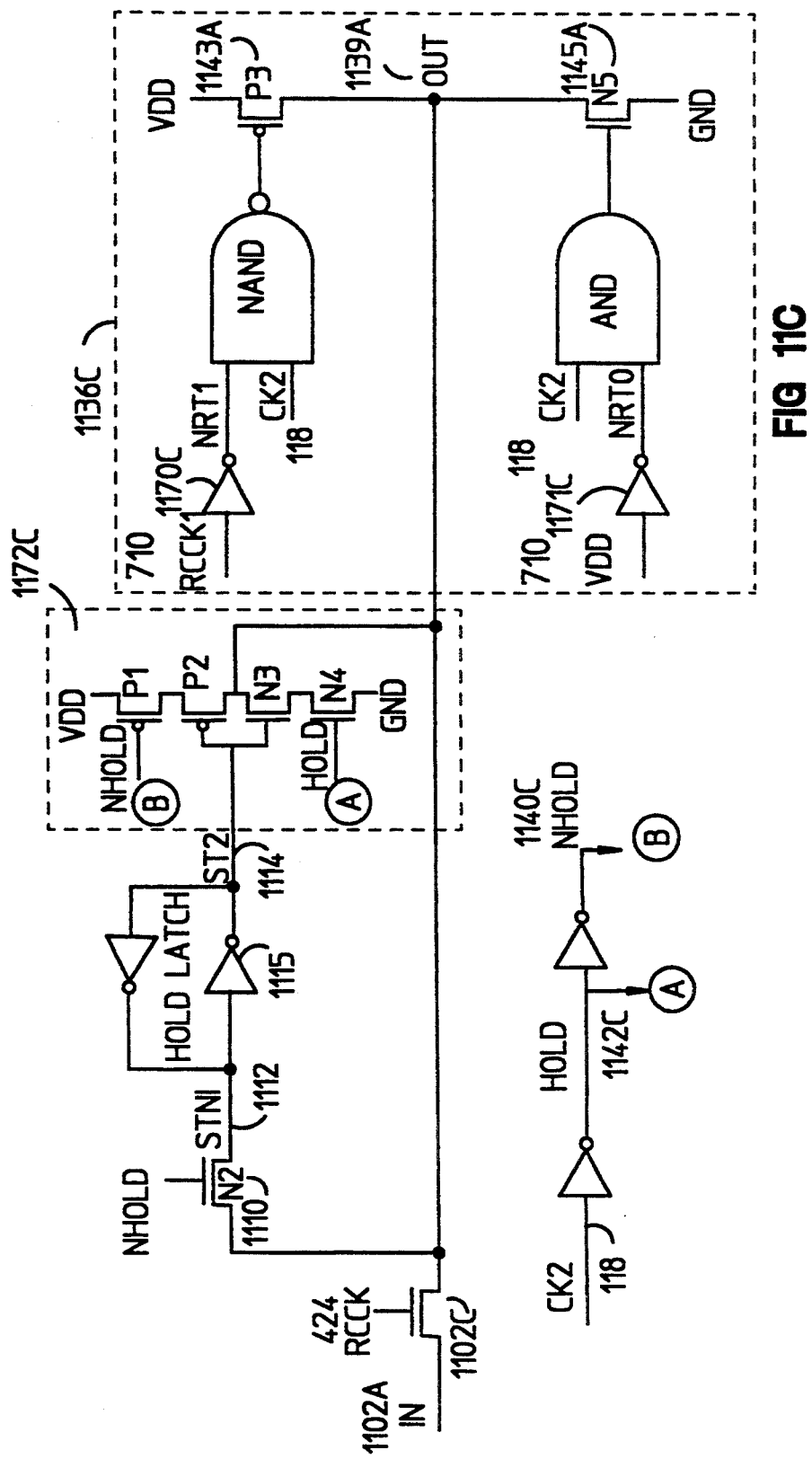
FIG. 11c illustrates a schematic diagram of a receiver modifier circuit configured in 'return to one' usage.

FIG. 11b shows a receiver modifier circuit wired to perform the "return to zero" function. During RCCK 424 states, signals pass unmodified through transistor N1 to the output 1139 and into the hold latch 1115. During CPU states when RCCK does not fire (i.e., when RCCK1 is low), the output 1139 is isolated from the input 1102, the output 1139 is pulled low through transistor N5, and the hold latch 1115 is updated so that a logical 0 will be held on the output 1139 when CK2 goes low. "Return to one" functionality works in much the same way. FIG. 11c illustrates the circuit connectivity which implements the "return to one" function. During CPU states when RCCK 424 will not fire, the output 1139 is pulled high through transistor P3. Physically, the circuits of FIGS. 11a, 11b and 11c are identical except for the way the inverter gates 1170A–1170C and 1171A–1171C inputs are wired.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An interface device for isolating timing control between a central processing unit (CPU) bus operating at a first clock frequency and a memory bus operating at a second clock frequency, comprising:

an output data queue connected to the CPU bus for accepting signals from a CPU connected to the CPU bus, and for transferring said signals at said second clock frequency to a first data bus;

a domain translation buffer, coupled to said first data bus and to the memory bus, for receiving, retiming and transferring said signals received from said first data bus to the memory bus, and for receiving, retiming and transferring signals sent from the memory bus to a second data bus;

a receiver modifier circuit connected to said domain translation buffer through said second bus for receiving signals sent from the memory bus through said domain translation buffer, for maintaining signal consistency, and for sending said signals to the CPU; and a clock control circuit for controlling when said domain translation buffer and said receiver modifier circuit transmit and receive signals, said clock control circuit having first and second clock signal outputs, said first clock signal output coupled to said receiver modifier circuit and said second clock signal output coupled to said domain translation buffer;

whereby a ratio of said first clock frequency to said second clock frequency is expressed as N:M, where N and M are positive integers.

2. The interface device as in claim 1, wherein said domain translation buffer further comprises:

a driver portion for transferring data signals from said output data queue to said memory bus, including a first comparator with first and second clock inputs logically combined to clock a first input latch, a third clock input connected to an output latch, a first data signal input, and a first data signal output;

whereby said first data signal input is clocked through said input latch, delayed a first predetermined amount, passed to and clocked through said output latch to said memory bus;

a receiver portion for transferring data signals from said memory bus to said receiver modifier circuit, including a second data signal input, a second data signal output, a fifth clock signal connected to a second input latch, a second comparator with fifth and sixth clock inputs logically combined to clock a second output latch;

whereby said second data signal input is clocked through said second input latch, delayed a second predetermined amount, passed to and clocked through said second output latch to said receiver modifier circuit.

3. The interface device as in claim 2, wherein said clock control circuit further comprises:

an output logic array with a plurality of mode indication signal inputs, a plurality of state indication signal inputs, an operating clock signal input, and a plurality of clock signal outputs;

a state machine with a plurality of state indication signal outputs, connected by a bus to said output logic array;

said state machine including a plurality of clock signal inputs, a mode indication signal input, and a feedback loop connecting said state signal outputs to a plurality of state machine inputs;

whereby said state machine generates said plurality of state indication signal outputs, transfers said indication signal outputs to said output logic array and to said state machine inputs via said feedback loop, and said plurality of logic array clock signal outputs are supplied to said receiver modifier circuit and said domain translation buffer by said output logic array.

4. The interface device as in claim 3, wherein said output data queue further comprises:

a plurality of master slave latches configured in a variable entry, serial output fashion, each master slave latch including:

a data load input;
   a load enable input;
   a serial data input;
   a serial data output;
   a shift enable input;
   a first clock enable input for clocking data into the master portion of the latch; and
   a second clock enable input for clocking data out in serial fashion on said serial data output;

whereby each of said plurality of master slave latches receives data in its master portion from said CPU bus upon a transition of said load enable input, transfers said data in said master portion to its slave portion upon a transition of said second clock enable input, receives data signals in serial fashion at said serial data input upon transition of its shift enable input, and transfers all received data serially to said domain translation buffer at said second clock frequency upon second clock enable signal transitions.

5. The interface device circuit as in claim 4, wherein said receiver modifier circuit further comprises:

a data signal input;
   a plurality of clock inputs;
   a latch for storing said data signal input;
   a data signal output;
   a plurality of modifier switches connected to high and low states for modifying data to a predetermined selection of one of said high and low states;
   logic circuitry for controlling said modifier switches;
   whereby said data signal input is gated through said latch to said data signal output, and modified to said predetermined high or low states by said modifier switches.

6. The interface device as in claim 1, wherein N=1 and M=1.

7. The interface device as in claim 1, wherein N=3 and M=2.

8. The interface device as in claim 1, wherein N=2 and M=1.

9. A method of signal transfer between a source and a destination comprising the steps of:

(a) generating a plurality of signals from a source operating at a first clock frequency and a first phase;

(b) translating said plurality of signals to operate at a second clock frequency and a second phase; and (c) receiving said signals at a destination operating at said second clock frequency and said second phase;

whereby a ratio of first clock frequency to second clock frequency is of the form N:M where N and M are integers.

10. The method of signal transfer as in claim 9 wherein step (b) further comprises:

(1) buffering said signals by loading said signals into a first in first out type buffer;

(2) clocking said signals out of said first in first out type buffer at a second clock frequency; and (3) translating said signals by passing said signals through a second buffer.

11. The method of signal transfer as in claim 10 wherein step 3 further comprises:

(i) translating said signals by delaying said signals in time;

whereby signal phase and clock frequency coincide with said second frequency and phase.

12. The method as in claim 11, wherein step (b) further comprises the step of:

(4) sending the output from said second buffer to a third buffer;

whereby said third buffer acts to maintain said signals at a predetermined consistency.

13. The method as in claim 12 where said source comprises a central processing unit and said destination comprises a memory unit.

14. The method as in claim 12 where said source comprises a memory unit and said destination comprises a central processing unit.

15. The method of claim 9, wherein N and M are different integers.

16. An interface device for isolating timing control between a central processing unit (CPU) bus operating at a first clock frequency and a memory bus operating at a second clock frequency, comprising:

first buffer means connected to the CPU bus for accepting signals from a CPU connected to the CPU bus, and for transferring said signals at said second clock frequency to a first data bus;

second buffer means, coupled to said first data bus and to the memory bus, for receiving, retiming and transferring said signals received from said first data bus to the memory bus, and for receiving, retiming and transferring signals sent from the memory bus to a second data bus;

third buffer means connected to said second buffer means through said second bus for receiving signals sent from the memory bus through said second buffer means, for maintaining signal consistency, and for sending said signals to the CPU; and clock control means for controlling when said second buffer means and said third buffer means transmit and receive signals, said clock control means having first and second clock signal outputs, said first clock signal output coupled to said third buffer means and said second clock signal output coupled to said second buffer means;

whereby a ratio of said first clock frequency to said second clock frequency is expressed as N:M, where N and M are positive integers.

17. The interface device as in claim 16, wherein said second buffer means further comprises:

a driver means for transferring data signals from said first buffer means to said memory bus, including a first comparator with first and second clock inputs logically combined to clock a first input latch, a third clock input connected to an output latch, a first data signal input, and a first data signal output;

whereby said first data signal input is clocked through said input latch, delayed a first predetermined amount, passed to and clocked through said output latch to said memory bus;

a receiver means for transferring data signals from said memory bus to said third buffer means, including a second comparator with fourth and fifth clock inputs logically combined to clock a second input latch, a sixth clock signal connected to a second output latch, a second data signal input, and a second data signal output;

whereby said second data signal input is clocked through said second input latch, delayed a second predetermined amount, passed to and clocked through said second output latch to said third buffer means.

18. The interface device as in claim 17, wherein said clock control means further comprises:

an output logic array with a plurality of mode indication signal inputs, a plurality of state indication signal inputs, an operating clock signal input, and a plurality of clock signal outputs;

a state machine with a plurality of state indication signal outputs, connected by a bus to said output logic array;

said state machine including a plurality of clock signal inputs, a mode indication signal input, and a feedback loop connecting said state signal outputs to a plurality of state machine inputs;

whereby said state machine generates said plurality of state indication signals, transfers said indication signals to said output logic array and to said state machine inputs via said feedback loop, and said plurality of logic array clock signal outputs are supplied to said third buffer means and said second buffer means by said output logic array.

19. The interface device as in claim 18, wherein said first buffer means further comprises:

a plurality of master slave latches configured in a variable entry, serial output fashion, each master slave latch including:

a data load input;

a load enable input;

a serial data input;

a serial data output;

a shift enable input;

a first clock enable input for clocking data into the master portion of the latch; and a second clock enable input for clocking data out in serial fashion on said serial data output;

whereby each of said plurality of master slave latches receives data in its master portion from said CPU bus upon a transition of said load enable input, transfers said data in said master portion to its slave portion upon a transition of said second clock enable input, receives data signals in serial fashion at said serial data input upon transition of its shift enable input, and transfers all received data serially to said second buffer means at said second clock frequency upon second clock enable signal transitions.

20. The interface device as in claim 19, wherein said third buffer means further comprises:

a data signal input;

a plurality of clock inputs;

a latch for storing said data signal input;

a data signal output;

a plurality of modifier switches connected to high and low states for modifying data to a predetermined selection of one of said high and low states;

logic circuitry for controlling said modifier switches;

whereby said input data signal is gated through said latch to said data signal output, and modified to said predetermined high or low states by said modifier switches.

21. The interface device as in claim 16, wherein the ratio N:M comprises one of 1:1, 2:1 and 3:2.

* * * * *